(12) United States Patent
Pickering et al.

(10) Patent No.: US 7,084,202 B2
(45) Date of Patent: Aug. 1, 2006

(54) MOLECULAR COMPLEXES AND RELEASE AGENTS

(75) Inventors: Jerry A. Pickering, Hilton, NY (US); David F. Cahill, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 197 days.

(21) Appl. No.: 10/454,900

(22) Filed: Jun. 5, 2003

(65) Prior Publication Data

US 2003/0232945 A1 Dec. 18, 2003

Related U.S. Application Data

(60) Provisional application No. 60/386,021, filed on Jun. 5, 2002.

(51) Int. Cl.
*C08L 83/04* (2006.01)

(52) U.S. Cl. .................... 524/588; 525/474; 525/477; 106/287.1; 528/21; 528/23

(58) Field of Classification Search ............... 524/588; 525/474, 477; 106/287.1; 528/21, 23, 588
See application file for complete search history.

(56) References Cited

U.S. PATENT DOCUMENTS

| | | | |
|---|---|---|---|
| 3,810,776 A | 5/1974 | Banks et al. |
| 3,937,637 A | 2/1976 | Moser et al. |
| 4,011,362 A | 3/1977 | Stewart |
| 4,029,827 A | 6/1977 | Imperial et al. |
| 4,034,706 A | 7/1977 | Moser |
| 4,045,164 A | 8/1977 | Moser |
| 4,046,795 A | 9/1977 | Martin |
| 4,101,686 A | 7/1978 | Strella et al. |
| 4,185,140 A | 1/1980 | Strella et al. |
| 4,264,181 A | 4/1981 | Lentz et al. |
| 4,272,179 A | 6/1981 | Seanor |
| 4,399,247 A * | 8/1983 | Ona et al. .................... 524/204 |
| 4,853,737 A | 8/1989 | Hartley et al. |
| 5,141,788 A | 8/1992 | Badesha et al. |
| 5,157,445 A | 10/1992 | Shoji et al. |
| 5,281,506 A | 1/1994 | Badesha et al. |
| 5,489,482 A | 2/1996 | Minemura et al. |
| 5,512,409 A | 4/1996 | Henry et al. |
| 5,516,361 A | 5/1996 | Chow et al. |
| 5,531,813 A | 7/1996 | Henry et al. |
| 5,568,239 A | 10/1996 | Furukawa et al. |
| 5,627,000 A | 5/1997 | Yamazaki et al. |
| 5,636,012 A | 6/1997 | Uneme et al. |
| 5,641,603 A | 6/1997 | Yamazaki et al. |
| 5,735,945 A | 4/1998 | Chen et al. |
| 5,780,545 A | 7/1998 | Chen et al. |
| 5,783,719 A | 7/1998 | Sun et al. |
| 5,835,833 A | 11/1998 | Dalal et al. |
| 5,925,779 A | 7/1999 | Cray et al. |
| 5,943,542 A | 8/1999 | Dalal et al. |
| 5,959,056 A | 9/1999 | Beach et al. |
| 6,011,946 A | 1/2000 | Eddy et al. |
| 6,261,688 B1 | 7/2001 | Kaplan et al. |
| 6,515,069 B1 | 2/2003 | Gervasi et al. |
| 2001/0019768 A1 | 9/2001 | Kaplan et al. |
| 2002/0086952 A1* | 7/2002 | Chino et al. ............. 525/327.6 |

OTHER PUBLICATIONS

Barton, CRC Handbook of Solubility Parameters and Other Cohesion Parameters, 2nd Edition, CRC Press, Inc., Boca Raton, FL, pp. 95, 108-109, 177-185 (1991).

* cited by examiner

*Primary Examiner*—Kuo-Liang Peng
(74) *Attorney, Agent, or Firm*—Carl F. Ruoff

(57) ABSTRACT

A molecular complex for application to fuser members in toner fusing systems. The complex is formed from molecules with complementary acid and base functional groups. These groups interact to provide a noncovalent bond having a bond energy of about 20 kJ/mol or more.

28 Claims, No Drawings

MOLECULAR COMPLEXES AND RELEASE AGENTS

CROSS-REFERENCE TO RELATED APPLICATIONS

This application claims benefit under 35 USC §119(e) of prior U.S. Provisional Patent Application No. 60/386,021, filed Jun. 5, 2002. This provisional patent application is incorporated herein in its entirety, by reference thereto.

Filed concurrently with this application is the application entitled "Block Polyorganosiloxane Block Organomer Polymers And Release Agents", U.S. Ser. No. 10/454,897 now U.S. Pat. No. 6,894,137. This concurrently filed application is incorporated herein in its entirety, by reference thereto.

BACKGROUND OF THE INVENTION

1. Field of the Invention

The present invention relates to a composition comprising a release agent, for application to one or more fuser members and the substrate in toner fusing systems and processes. The present invention further relates to combating toner offset by means of applying the composition as indicated to one or more fusing members in toner fusing systems and processes.

2. Description of Background and Other Information

Generally in electrostatographic reproduction, the original to be copied is rendered in the form of a latent electrostatic image on a photosensitive member. This latent image is made visible by the application of electrically charged toner.

The toner thusly forming the image is transferred to a substrate—also referred to in the art as a receiver—such as paper or transparent film, and fixed or fused to the substrate. Where heat softenable toners—for example, comprising thermoplastic polymeric binders—are employed, the usual method of fixing the toner to the substrate involves applying heat to the toner, once it is on the substrate surface, to soften it, and then allowing or causing the toner to cool. This application of heat in the fusing process is preferably at a temperature of about 90° C. –220° C.; pressure may be employed in conjunction with the heat.

A system or assembly for providing the requisite heat and pressure is generally provided as a fusing subsystem, and customarily includes a fuser member and a support member. The various members that comprise the fusing subsystem are considered to be fusing members; of these, the fuser member is the particular member that contacts the toner to be fused by the fusing subsystem. The heat energy employed in the fusing process generally is transmitted to toner on the substrate by the fuser member. Specifically, the fuser member is heated; to transfer heat energy to toner situated on a surface of the substrate, the fuser member contacts this toner, and correspondingly also can contact this surface of the substrate itself. The support member contacts an opposing surface of the substrate.

Accordingly, the substrate can be situated or positioned between the fuser and support members, so that these members can act together on the substrate to provide the requisite pressure in the fusing process. In cooperating, preferably the fuser and support members define a nip, or contact arc, in which the substrate is positioned or resides, and/or through which the substrate passes. Also as a matter of preference, the fuser and support members are in the form of fuser and pressure rollers, respectively. Yet additionally as a matter of preference, one or both of the fuser and support members have a soft layer that increases the nip, to effect better transfer of heat to fuse the toner.

During the fusing process toner can be offset from the substrate to the fuser member. Toner thusly transferred to the fuser member in turn may be passed on to other members in the electrostatographic apparatus, or to subsequent substrates subjected to fusing.

Toner on the fusing member therefore can interfere with the operation of the electrostatographic apparatus and with the quality of the ultimate product of the electrostatographic process. This offset toner is accordingly regarded as contamination of the fuser member, and preventing or at least minimizing this contamination is a desirable objective.

Toner offset is a particular problem when polyester toners are used. Polyester toners are frequently used in high quality color and black and white printing applications. In particular, offset to the fuser member can collect on other members of the fusing subsystem, such as external heating members for heating fuser members, and release agent applicators—e.g., oilers.

In this regard, release agents can be applied to fusing members during the fusing process, to combat toner offset. These agents usually are or include polyorgano-siloxanes, particularly polyorganosiloxane oils. The polysiloxanes have antiadhesive properties that are favorable for protecting the surface of the fuser member, and maintaining the durability of the fuser member.

Modified polysiloxanes having functional groups provide a protective barrier by attaching to the fuser surface via specific interactions between the functional groups and the fuser surface. The interaction of the functional groups with the fuser surface allows the polysiloxane to sterically block contact of the toner with the fuser member surface and provide a protective barrier.

Monofunctional polysiloxanes with one reactive functional group may interact with the fuser member or toner surface to provide a protective coating as well as increase the wetting of nonfunctional components in the polymeric release agent composition. Multifunctional polysiloxanes with more than one reactive group also interact in the same manner to provide a protective coating; however, the presence of more than one functional group may allow undesired additional interaction with other components.

As to functional polyorganosiloxanes, U.S. Pat. No. 6,261,688 and U.S. Publication No. 2001/0019768 disclose polymeric release agents comprising organosiloxane polymers with tertiary amino functional groups. Among the tertiary amino functional groups disclosed are those where the N atom has an alkyl or arylalkyl as one substituent group, and an acyl [—C(=O)—CH$_3$] group as the other.

Further, U.S. Patent No. 5,157,445 discloses a toner release oil composition containing an organopolysiloxane with one or more secondary amino substituents, where the secondary amine N atom has a C$_{1-8}$ alkylene substituent terminated by NH$_2$. Also disclosed as eligible release oil ingredients are organopolysiloxanes having aromatic secondary amino substituents.

U.S. Pat. Nos. 5,531,813 and 5,512,409 disclose secondary amino functional polyorganosiloxanes, where the N atom can have—besides the H atom—a C$_{1-18}$ alkyl or arylalkyl substituent. These patents also disclose the polyorganosiloxanes as monoamino functional polymers, with the monoamino functionality interacting with the hydrofluoroelastomer surface of a fuser member; this interaction is stated to provide a barrier to the toner, as well as a low surface energy film to release the toner from the surface. Additionally as to monoamino functionality in particular, branched T-type monoamino functional poly-siloxanes, in which the reactive group is attached to a central silicon atom, are disclosed in U.S. Pat. No. 5,516,361.

Functional polysiloxanes also are described in U.S. Pat. No. 4,101,686, which discloses polymeric release agents having functional groups such as carboxyl, hydroxy, epoxy, amino, isocyanate, thioether, and mercapto groups. This patent states that the polymeric release agents are applied to a heated fuser member to prevent toner adhesion. Similarly, U.S. Pat. Nos. 4,272,179 and 4,264,181 disclose polymeric release agents which have functional groups, and which are applied to the surface of a fuser member.

U.S. Pat. No. 4,029,827 discloses a fusing process utilizing a mercaptofunctional polyorganosiloxane applied to a heated metal fuser member. U.S. Pat. No. 3,810,776 discloses a release agent comprising a fatty acid metal salt and silicone oil. U.S. Pat. No. 4,011,362 discloses the application of carboxy functional siloxanes to metal substrates, such as fuser rollers, to improve their release characteristics.

U.S. Pat. Nos. 3,937,637, 4,034,706, and 4,045,164 all disclose fusing processes utilizing a heated metal or glass fuser roll. The first of these patents teaches coating the roll with a low molecular weight polyethylene; the second teaches coating initially with a low molecular weight polyethylene, then with a low viscosity silicone oil, and the third teaches coating with a composition comprising polyethylene and silicone oil.

Additionally, U.S. Pat. Nos. 5,141,788 and 5,281,506 disclose a fuser member comprising a polyorgano-siloxane having reactive functional groups which is grafted to the surface of the cured fluoroelastomer layer. U.S. Pat. No. 4,853,737 also discloses a fuser roller having an outer layer comprising a cured fluoroelastomer, with polydiorganosiloxane segments that are covalently bonded to the backbone of the fluoroelastomer; the polydiorgano-siloxanes have functional groups, at least one of which is present on the polydiorganosiloxane chain to form the covalent bond to the fluoroelastomer backbone.

U.S. Provisional Patent Application No. 60/305,874, filed Jul. 18, 2001, discloses monofunctional branched polysiloxanes, wherein the branched siloxane chain provides enhanced coverage of the surface and resistance to extension under shear. This provisional application is incorporated herein in its entirety, by reference thereto.

In addition to functional groups, polysiloxane release fluids have been modified with nonreactive organo groups that promote interaction or wetting of surface components. U.S. Pat. No. 5,780,545 discloses a stabilized polyether modified organosiloxane that acts as a surfactant to promote wetting and that reduces offset. U.S. Pat. Nos. 5,568,239, 5,641,603, 5,627,000, and 5,636,012 disclose polyorganosiloxanes modified with side groups or end groups of fluorocarbon chains, for promoting the wetting of fluorocarbon surfaces such as tetrafluoroethylene. U.S. Pat. Nos. 5,783,719 and 5,959,056 disclose long chain hydrocarbon modification of organosiloxanes as solid release agents, and as being useful for other purposes—e.g., sealing toner cartridges; further, it is suggested that the long hydrocarbon chain may also act as a surfactant for the toner.

It would be desirable to have an agent that promotes wetting as a surfactant, and that also exhibits reactivity to and/or interaction with polar sites—on the toner, or on the fuser member surface—to act against or combat adherence of the toner to surfaces, or to polar sites on fuser members, that tend to attract toner offset. It would further be desirable that the composition could be easily prepared.

SUMMARY OF THE INVENTION

The present invention is characterized by novel molecular complexes that exhibit improved wetting of toner surfaces, while interacting with both acidic and basic polar sites, on fuser members and toner surfaces, to combat—e.g., prevent or prohibit, or at least inhibit, or lessen, or reduce—toner offset. The present invention further provides novel molecular complexes that demonstrate improved wetting of fluorocarbon surfaces, while still interacting with polar sites to prevent toner offset.

The molecular complexes of the invention may be used for imparting—to the fusing member substrate surfaces, and to toner residing or contacting thereon—resistance to toner offset and accumulation on fusing members. In this regard, the invention pertains to a composition for acting against, or combating—e.g., preventing or prohibiting, or at least inhibiting, or lessening, or reducing—toner offset and buildup on fusing members.

The invention further pertains to a process for fusing toner residing on a substrate surface to the substrate surface. This process comprises applying, to the surfaces of fuser members, a treating composition comprising a molecular complex of the invention, and contacting the toner with the fuser member surface bearing this composition.

DESCRIPTION OF THE INVENTION

Copolymers are understood as including polymers incorporating two monomeric units, i.e., bipolymers, as well as polymers incorporating three or more different monomeric units, e.g., terpolymers, tetrapblymers, quaterpolymers, etc.

Polymeric molecules are understood as including molecules that comprise at least about 25 monomeric units. For copolymers, this includes the sum of each different monomeric unit, provided that the monomeric units are repeated at least twice within the polymer.

Molecules that do not meet the foregoing requirements for polymeric molecules are nonpolymeric molecules.

Polyorganosiloxanes are understood as including functional and nonfunctional polyorganosiloxanes. Polyorganosiloxanes further are understood as including polydiorganosiloxanes—i.e., having two organo groups attached to each, or substantially each, or essentially each, of the polymer siloxy repeat units. Polyorganosiloxanes yet further are understood as including polydimethylsiloxanes.

Functional polyorganosiloxanes are understood as being polyorganosiloxanes having functional groups on the backbone, connected to the polysiloxane portion, which can react with fillers present on the surface of the fuser member, or with a polymeric fuser member surface layer or component thereof. Functional polyorganosiloxanes further are understood as being polyorganosiloxanes having functional groups such as amino, hydride, halo (including chloro, bromo, fluoro, and iodo), carboxy, hydroxy, epoxy, isocyanate, thioether, and mercapto functional groups. Nonfunctional polyorganosiloxanes further are understood as being polyorganosiloxanes without groups of the type as indicated.

The term "hydrocarbyl" is understood as including "aliphatic", "cycloaliphatic", and "aromatic", and "hydrocarbyl" further is understood as including saturated, unsaturated, linear, branched, cyclic, and acyclic "hydrocarbyl". "Hydrocarbyl" is also understood as including "alkyl", "alkenyl", "alkynl", "cycloalkyl", "aryl", "aralkyl", and "alkaryl". Additionally, "hydrocarbyl" is understood as including both nonsubstituted hydrocarbyl and substituted hydrocarbyl, with the former referring to the hydrocarbyl consisting of, or consisting essentially of, carbon and hydrogen atoms, and the latter referring to the hydrocarbyl bearing one or more additional substituents. The one or more additional substituents can be present along with carbon and hydrogen atoms, and or can be present in place of one, or more, or all, of the hydrogen atoms. Substituted hydrocarbyl encompasses halocarbyl (e.g., chloro, bromo, iodo, and especially fluorocarbyl), particularly haloalkyl (e.g., chloro, bromo, iodo, and especially fluoroalkyl), and encompasses fully and partially halogenated (e.g., chlorinated, brominated, iodinated, and especially fluorinated) hydrocarbyl, including perhalocarbyl (e.g., perchloro, perbromo, periodo, and perfluorocarbyl), and particularly perhaloalkyl (e.g., perchloro, perbromo, periodo, and especially perfluoroalkyl).

Further with respect to the foregoing, "hydrocarbyl" is understood as including nonhalogenated hydrocarbyl, which refers to hydrocarbyl that is free, or at least essentially free, or at least substantially free, of halogenation—i.e., of chlorine, bromine, iodine, and fluorine atoms. Correspondingly, "hydrocarbyl" is understood as including nonfluorinated, nonchlorinated, nonbrominated, and noniodinated hydrocarbyl; these refer to hydrocarbyl that is free, or at least essentially free, or at least substantially free, respectively, specifically of fluorination (i.e., of fluorine atoms), chlorination (i.e., of chlorine atoms), bromination (i.e., of bromine atoms), and iodination (i.e., of iodine atoms). The term "organo" as used herein, such as in the context of polyorganosiloxanes, includes hydrocarbyl. Preferred organo groups for the polyorganosiloxanes are the alkyl, aryl, and aralkyl groups. Particularly preferred alkyl, aryl, and aralkyl groups are the $C_1$–$C_{18}$ alkyl, aryl, and araikyl groups, particularly the methyl and phenyl groups.

It is understood that use conditions are those conditions, such as temperature, at which the release agent of the invention, or a component thereof, is being manipulated—for instance, physically transferred—in conjunction with their employment for a process of the invention. In this regard, use conditions include the conditions under which the release agent or component is depleted from its sump, or storage area, as well as conditions in the electrostatographic reproduction apparatus and system during operation, particularly fusing process conditions, and conditions under which the release agent or component is being applied to the toner and/or substrate surface.

Organomers include hydrocarbons and perhalopolyethers, and organomer blocks correspondingly include hydrocarbyl blocks and perhalopolyether blocks. The preferred perhalopolyethers are the perfluoropolyethers.

The term "halo" as used herein includes chloro, bromo, iodo, and fluoro.

Unless stated otherwise, molecular weights set forth herein are number average molecular weights ($M_n$), measured in Daltons.

The invention pertains to a complex comprising at least one release agent polymeric first molecule, at least one second molecule, and at least one complexed group, or functionality, formed by first and second molecules as indicated. The at least one second molecule comprises at least one member selected from the group consisting of wetting agent polymeric and nonpolymeric molecules, antioxidant polymeric and nonpolymeric molecules, antistat polymeric and nonpolymeric molecules, and release agent polymeric molecules; the at least one second molecule accordingly can comprise at least one release agent polymeric second molecule.

The molecules forming the complex of the invention can be referred to as complexors.

The complex can include one or more release agent first molecules, together with one or more release agent second molecules, and/or one or more wetting agent second molecules, and/or one or more antioxidant second molecules, and/or one or more antistat second molecules. Preferably, the complex comprises at least one release agent polymeric first molecule, and at least one second molecule selected from the group consisting of release agent polymeric molecules, and wetting agent polymeric and nonpolymeric molecules.

Release agent first and second molecules have a surface energy of about 35 dynes/cm or less. They are liquid at fusing process temperatures—e.g., within the range of from about 90° C., or about 120° C., or about 150° C., to about 200° C., or about 220° C., or about 250° C.—and preferably, also at fusing temperatures, have a viscosity of about 250,000 cp or less.

Release agent first and second molecules yet additionally are heat stable at fusing process temperatures. Heat stability here means that there is no gelation, or at least essentially no gelation, over a time period of from about one hour to about 24 hours, and additionally that there is not more than about 5 percent by weight volatilization, also over a time period of from about one hour to about 24 hours.

In accordance with the foregoing, release agent molecules are suitable as second molecules for the invention. In this regard, release agent molecules that are suitable as first molecules also may be used as second molecules—specifically, as release agent second molecules—for the invention. Conversely, release agent molecules that may be employed as second molecules also are suitable as first molecules.

A release agent first molecule comprises at least one first complexing group, or moiety—i.e., has one of these groups, or moieties, or has two or more of these groups, or moieties. A second molecule of the invention comprises at least one second complexing group, or moiety—i.e., has one of these groups, or moieties, or has two or more of these groups, or moieties.

Complexing moieties include complexing functional groups; specifically, a first complexing moiety includes a first complexing functional group, and a second complexing moiety includes a second complexing functional group. A complexing moiety can consist of, or consist essentially of, or consist substantially of, a complexing functional group as indicated, or it can further include one or more substituents in addition to the complexing functional group.

Complexing functional groups of the invention include complexing acid functional groups and complexing base functional groups. Specifically, a first complexing functional group can be either a complexing acid functional group or a complexing base functional group, and a second complexing functional group likewise can be either a complexing acid functional group or a completing base functional group. Accordingly, a first complexing moiety can comprise either a complexing acid functional group or a completing base functional group, and a second complexing moiety also can comprise either a complexing acid functional group or a complexing base functional group.

As to the foregoing, an acid functional group is understood as being a functional group capable of bonding with a pair of unshared electrons; preferably, an acid functional group also is capable of donating a proton in forming the functionality. A base functional group is understood as being a functional group comprising an atom having a pair of unshared electrons; preferably, a base functional group also is capable of accepting a proton in forming the functionality.

Acid functional groups suitable as complexing functional groups of the invention include the carboxyl group (—COOH), the sulfonic acid group

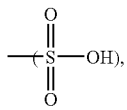

the sulfonamide group

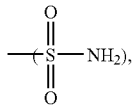

the para-phenol group

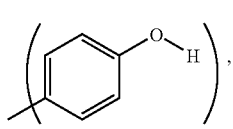

the meta-phenol group

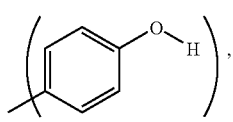

the monoalkyl phosphate ester group

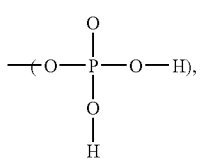

and the dialkyl phosphate ether groups

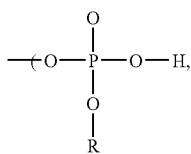

where R is selected from the group consisting of $C_1$–$C_8$ hydrocarbyl groups).

Base functional groups that may be used include secondary and tertiary amine groups, the primary amine group(—$NH_2$), the para-pyridine group

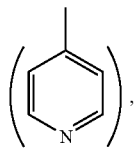

the meta-pyridine group

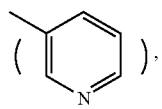

the pyrrole group

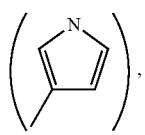

and the phosphonium groups

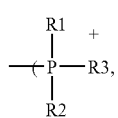

where $R^1$, $R^2$, and $R^3$ are the same or different, and are selected from the group consisting of $C_1$–$C_8$ hydrocarbyl groups).

A completing moiety—whether a first or a second moiety—that comprises a complexing acid functional group can be referred to as a complexing acid functional moiety. Correspondingly, a first or a second moiety that comprises a complexing base functional group can be referred to as a complexing base functional moiety.

Suitable complexing acid and base functional moieties include acid and base functional hydrocarbyl groups, especially acid and base functional alkyl groups. As to these, the acid and base functional $C_1$ and greater hydrocarbyl groups, and especially the acid and base functional $C_1$ and greater alkyl groups, are preferred, with the acid and base functional $C_1$–$C_{10}$ hydrocarbyl groupsi and especially the acid and base functional $C_1$–$C_{10}$ alkyl groups, being particularly preferred, and the acid and base functional $C_1$ and greater n-alkyl groups, especially n-propyl groups with the acid or base functional group bonded to the terminal C atom—e.g., 3-aminopropyl ($H_2NCH_2CH_2CH_2$—) and 3-carboxypropyl ($HOOCCH_2CH_2CH_2$—)—being most preferred.

With a release agent first molecule that comprises more than one complexing moiety, all the complexing moieties of this first molecule can be acid functional moieties, or all the completing moieties of this first molecule can be base functional moieties, or this release agent first molecule can have both acid and base functional moieties—i.e., both one or more completing acid functional moieties, and also one or more complexing base functional moieties. Correspondingly, with a second molecule that comprises more than one complexing moiety, all the complexing moieties of this second molecule can be acid functional moieties, or all the complexing moieties of this second molecule can be base functional moieties, or this second molecule can have both acid and base functional moieties—i.e., both one or more complexing acid functional moieties, and also one or more complexing base functional moieties.

Also, with a release agent first molecule or a second molecule that includes two or more completing acid functional moieties, all these moieties can comprise the same type of completing acid functional group, or two or more different types of complexing acid functional groups—for instance, where a molecule has two complexing acid functional moieties, one can be a carboxy functional moiety, and the other can be a sulfonic acid functional moiety. Correspondingly, with a release agent first molecule or a second molecule that includes two or more complexing base functional moieties, all these moieties can comprise the same type of complexing base functional group, or two or more different types of complexing base functional groups—for instance, where a molecule has two complexing base functional moieties, ohe can be a pyridine functional moiety, and the other can be a pyrrole functional moiety.

Complexed functionalities of the invention result from the interaction of a complexing acid functional moiety with a complexing base functional moiety—specifically, between a complexing acid functional group and a, complexing base functional group. The acid and base functional groups complex to provide a complexed functionality.

Accordingly, the complexing acid and base functional groups are understood as being complementary groups. Correspondingly, acid and base functional moieties are understood as being complementary moieties.

Particular acid and base group pairs that are preferred complementary groups are the carboxyl and primary amine groups, the carboxyl and meta- or para-pyridine groups, the sulfonic acid and meta- or para-pyridine groups, the sulfonic acid and primary amine groups, the carboxyl and tertiary amine groups, and the sulfonic acid and tertiary amine groups. Of these, the pairing of the carboxyl group with the primary amine group, as complementary groups, is especially preferred.

In complexing, the indicated acid and base functional groups form a noncovalent bond having a bond energy of at least about 20 kJ/mol—more preferably of at least about 30 kJ/mol, and still more preferably of at least about 35 kJ/mol. The bond energy of the noncovalent bond preferably also is less than 150 kJ/mol.

Yet additionally as a matter of preference, the noncovalent bond is an ionic bond or a hydrogen bond. In this regard, the particular type of noncovalent bond provided, in specific instances, will depend on a variety of circumstances, such as the atomic structures of the acid and base functional groups forming the complexed functionality, the conditions (e.g., temperature) and type of environment in which the molecular complex is situated, etc.

The molecular complex of the invention that comprises first and second molecules comprises at least one complexed functionality formed between a release agent first molecule and a second molecule—i.e., by a first complexing functional group that comprises one of a complexing acid functional group and a complexing base functional group, interacting with a second complexing functional group that comprises the other of these acid and base functional groups, to provide the complexed functionality. Where the molecular complex comprises two or more complexed functionalities, each—or at least essentially each, or at least substantially each—of the functionalities can be provided thusly by first and second complexing moieties. Alternatively, depending upon the composition of the first and second molecules, there can be—in addition to one or more functionalities each being obtained by the complexing of a first moiety and a second moiety—one or more complexed functionalities formed by two first complexing moieties—i.e., one being acid functional and the other being base functional—and/or one or more complexed functionalities formed by two second complexing moieties—here also, one being acid functional and the other being base functional.

As to using molecular complexes of the invention—particularly, using these complexes in toner fusing processes—it is believed that the first molecules, second molecules, and complexed functionalities all have advantageous effects, in facilitating the combating of toner offset and toner buildup on fuser members.

In this regard, combating of toner offset is effected by the wetting of surfaces with the release agent molecules of the molecular complexes. With complexes that include wetting agent second molecules, the wetting agent molecules are attracted to the surfaces to be wet, and thusly the complexed release agent molecules are brought along with the molecular complexes.

And regarding benefits provided by the complexed functionalities, toner offset,is further combated by blocking, covering or otherwise neutralizing attachment sites—particularly polar sites, or high energy sites—such as on the toner and/or on the fuser member, that may cause toner buildup. Attachment sites may result from a variety of sources, such as fillers—e.g., exposed fusing surface layer fillers, like metal oxides—contaminants, oxidation products, additives, debris—e.g., paper debris—abrasion products, and the like. It is therefore beneficial to have the capability of interacting with as great a variety of these sites as is possible.

Because the complexed functionality is at the linkage between two molecules, either may bring it to a surface to attach to an attachment site, and participate in shielding the site. By virtue of their polarity, complexed functionalities strongly interact with high energy sites. And actually, these functionalities are particularly effective for several reasons.

For instance, the two groups that comprise a complexed functionality, because they are bonded noncovalently, retain their identity, and so both are available for interacting with attachment sites. Secondly—and also because they are not covalently bonded—both of the two groups retain greater activity for the desired interaction; in fact, an attachment site may react permanently with either of the two complexing groups, thereby shielding the attachment site more securely. And as a third point, the two groups of a functionality are of different types—one being acid functional, the other being base functional—and so provide the capability for interaction with more different types of sites. Particularly, each of these two functional groups is available for interaction with a complementary site—specifically, the complexing acid functional group with a basic site, and the complexing base functional group with an acidic site.

A molecular complex of the invention comprising first and second molecules can be prepared from at least one release agent first molecule, and at least one of the second molecules as discussed. There must be at least one first molecule and at least one second molecule—there must be at least two complexors—with complementary complexing moieties—i.e., complementary complexing functional groups. Specifically, there has to be at least one first complexing functional group that comprises one of a complexing acid functional group and a complexing base functional group, and at least one second complexing functional group that comprises the other of these acid and base functional groups, with these thusly complementary groups forming a complexed functionality, as discussed.

In a complex preparation process, each of the complexors is employed in the liquid phase. The liquid phase is provided either by dissolving the complexors in solvent, or by using complexors that themselves are liquid.

Where solvent is used, the complexors may be either solids or liquids at the temperature of the preparation process. One or more solvents may be employed, and solvents appropriate for this purpose can be determined without undue experimentation by those of ordinary skill in the art.

As to employing complexors themselves in liquid form, those which are solid at 25° C.—i.e., ambient, or room, temperature—may be melted. Where one or more complexors is indeed solid, melting may be effected before the complexors are combined. Whether or not melting is required, complexors being used thusly as liquids can be combined neat, without solvent. The complex preparation procedure may be conducted under heat, at a temperature sufficient to effect the requisite melting; specifically, the complexors may be melt blended.

Accordingly, the complexors can be added together, and brought to a temperature sufficient to place all of the complexors in a liquid state. If all of the complexors are liquid at ambient temperature, then heating is not necessary at this point; otherwise, heating is effected to raise the temperature sufficiently so as to melt all solid complexor or complexors.

The complexors are combined in the indicated liquid phase, and mixed sufficiently to effect complexation. Preferably, they are mixed at least until a uniform composition is obtained.

Even where heating is employed—e.g., to effect complexor melting—the temperature is maintained below the point at which covalent bonding of the complexed functionality, or any other degradation of the complex, would result. As long as the complexors are in the liquid phase they will complex, even if no heating is required to achieve the liquid phase.

Therefore, complexors that are in liquid phase at ambient temperature will complex at ambient temperature. And so with these complexors, the preparation may be conducted at ambient temperature.

Preparing molecular complexes of the invention is simplified because of the complementary nature of the complexing functional groups. Mixing is facilitated by the miscibility of the acid and base groups.

Particularly for preparing a complex where the complexors comprise both polyorganosiloxane and organomer complexors, and where the complementary complexing functional groups comprise primary amine and carboxyl groups, the complexors are added together to form a mixture. As discussed, the mixture is brought to a temperature—ambient or higher, as required—at which all complexors are in a liquid state. Preferably, the mixture is heated to a temperature sufficient to melt the organomer. The mixture is suitably blended, or mixed—preferably, as discussed, to a uniform composition.

As to the matter of temperature, at less than about 100° C., generally the primary amine and carboxyl groups will only complex, so limiting the reaction time is not a crucial factor. However, if the temperature indeed is too high, the primary amine and carboxyl groups will go beyond complexing, and covalently bond to provide the amide group; and the temperature at which this amidization occurs generally is about 100° C. or greater.

In fact, at temperatures above about 100° C., the higher the temperature, the faster the amidization rate, and the longer the period of time the temperature is maintained, the greater the extent of amidization. Accordingly, the period of time that the composition is maintained at or above 100° C. should be minimized, to minimize the formation of amide. Further, the temperature above 100° C. that is employed should be as low as will provide the necessary result—e.g., the requisite complexation.

As to the foregoing, the temperature preferably should be maintained below about 150° C., more preferably below about 130° C., still more preferably below about 110° C., and still more preferably below about 100° C. If the temperature indeed is maintained above about 100° C., or above about 110° C., then—as indicated—it should be minimized, but still sufficient to melt the mixture components completely, and to provide a uniform composition.

During the complexation, preferably the mixture is continuously blended or mixed. However, this treatment is not required beyond what is necessary to obtain a uniform composition.

The complexation may be conducted in the ambient air, such as in an open kettle, or in a closed system, provided there are means for removing evolved water. Water removal may be done with a nitrogen sweep, or by vacuum.

And where the complexors comprise both polyorganosiloxane and organomer complexors, and where the complementary complexing functional groups comprise primary amine and sulfonic acid groups, here also the complexors are added together to form a mixture, which is brought to a temperature high enough to provide all the complexors in a liquid state; here also, preferably the mixture is heated to a temperature sufficient to melt the organomer. Yet additionally, here also the mixture is suitably blended, or mixed, and preferably to a uniform composition.

However, complexed functionalities formed by complexing primary amine and sulfonic acid functional groups do not tend to react above 100° C., but can withstand elevated temperatures without degrading or forming a covalent bond. Accordingly, the composition may be maintained at elevated temperatures for extended periods provided that decomposition of the materials does not begin to occur.

Such decomposition may occur above about 150° C., or about 200° C., or greater.

As to using molecular complexes of the invention in toner fusing systems, application to the heated fuser member will cause certain complexes—depending upon such factors as the identity of the particular acid and base functional groups forming the complexed functionality, and the temperature of the fusing member surface—to react, and accordingly form a covalently bonded group. This in fact will occur with complexed functionalities formed from the indicated primary amine and carboxyl groups, if the temperature is high enough. Generally in the case of the primary amine and carboxyl groups, amidization will occur at temperatures of about 100° C. or greater; the higher the temperature above 100° C., the faster the amidization rate.

The covalently bonded groups resulting from this reaction of the complexes are themselves polar functionalities. Such a covalently bonded group does have utility for achieving the desired interaction with (particularly, neutralization of) attachment sites, but is less effective for this purpose than a complexed functionality.

One reason for this difference is that the polar functionality serves only as a single group for the indicated site interaction, while with the complexed functionality both of its constituent groups remain available, as discussed. A second reason is that the complex's two groups are both more active for this purpose than the covalently bonded polar functionality, which is not as strong as either uncovalently bonded group individually.

However, a benefit of molecular complexes that do undergo this covalent bonding on the fuser member is that the benefits that accrue from having the complex are realized until covalent bonding occurs. And in fact, the covalently bonded product can have advantages over the molecular complex. For instance, once transfer from the fuser member surface to the substrate has occurred, the covalently bonded product can be preferable to the complex, as having less activity or availability for undesired reactions.

In these instances, the indicated heat reactive molecular complexes, that undergo covalent bonding at the higher temperatures—e.g., those with primary amino/carboxy complexed functionalities, as discussed—can be doubly advantageous. They provide a beneficial greater reactivity where desired on the fuser member surface, and are less reactive on the substrate surface, where less reactivity is preferred.

Regarding this matter, it is particularly preferred that primary amine groups not be provided to the substrate. Accordingly, complexes which do have primary amine as the complexing base functional group, but nevertheless also are covalently bonded by the fuser member, are characterized by the double advantage as discussed.

Further to the foregoing, it is advantageous that treating compositions of the invention be free, or at least essentially free, of free (e.g., uncomplexed) primary amine groups. It is correspondingly advantageous that molecular complexes of the invention be free, or at least essentially free, of free (e.g., uncomplexed) primary amine groups.

Yet further, where primary amino functional first and/or second molecules are used to prepare the complexes of the invention, it is preferred, when the preparation process is complete, that there are no remaining, or at least essentially no remaining, free complexing primary amino functional moieties; there are no remaining, or at least essentially no remaining, free complexing primary amino functional groups. It is also preferred that the process of preparation leaves no remaining free primary amino functional first or second molecules, or at least essentially no remaining free primary amino functional first or second molecules.

Accordingly, where primary amino functional first and/or second molecules are used to prepare molecular complexes of the invention, preferably an excess of complexing acid functional groups, over complexing base functional groups, is used—particularly, preferably the ratio of acid functional complexing moieties, to base functional complexing moieties, is greater than 1:1. As a matter of particular preference, this ratio is sufficiently greater than 1:1 so that the resulting molecular complex is free, or at least essentially free, of free primary amine groups. Also, as a matter of particular preference, the indicated ratio is sufficiently greater than 1:1 so that, when the preparation process is complete, there are no remaining, or at least essentially no remaining, uncomplexed primary amino functional complexing moieties; there are no remaining, or at least essentially no remaining, uncomplexed primary amino functional complexing groups. Yet additionally as a matter of particular preference, the indicated ratio is sufficiently greater than 1:1 so that the process of preparation leaves no remaining free primary amino functional first or second molecules, or at least essentially no remaining free primary amino functional first or second molecules.

The discussion concerning the ratio, of complexing acid functional moieties to complexing base functional moieties, pertains to the ratio, of complexing acid functional groups to complexing base functional groups.

Preferably the molecular complexes of the invention have a molecular weight of 3,000 or greater. More preferably, molecular complexes of the invention have a molecular weight of from about 4,000 to about 250,000, and still more preferably of from about 6,000 to about 100,000.

Yet additionally as a matter of preference, molecular complexes of the invention preferably have a viscosity of from about 10 cSt to about 200,000 cSt at use temperatures. Accordingly, the complexes may be solid at ambient temperature, but liquid at fusing process temperatures, or at the temperature of their delivery systems during operation of toner fusing systems.

Also as a matter of preference, molecular complexes of the invention are thermally stable up to a temperature of at least about 120° C.—more preferably of at least about 130° C., and still more preferably of at least about 150° C. It is understood that with reference to molecular complexes of the invention, the indicated thermal stability entails the absence, or at least the essential absence or substantial absence, of gelation.

Suitable release agent first molecules of the complex of the invention include polyorganosiloxane and organomer, including hydrocarbon and perhalopolyether, complexors. Suitable release and wetting agent second molecules of the complex of the invention also include polyorganosiloxane and organomer complexors.

Polyorganosiloxanes, hydrocarbons, and perhalopolyethers that may be used as complexors for the present invention may be prepared in accordance with processes as are known in the art. Suitable polyorganosiloxane, hydrocarbon, and perhalopolyether complexors include polyorganosiloxane, hydrocarbon, and perhalopolyether polymers, oligomers, and macromers.

Any of the polyorganosiloxane, hydrocarbon, and perhalopolyether complexors can be employed as the indicated first molecules of the complex, and any of the polyorganosiloxane, hydrocarbon, and perhalopolyether complexors can be employed as the indicated second molecules of the complex, depending upon the environment in which they are employed. Particularly, any of the polyorganosiloxane, hydrocarbon, and perhalopolyether complexors can be employed as release agent molecules of the complex, and any of the polyorganosiloxane, hydrocarbon, and perhalopolyether complexors can be employed as the wetting agent molecules of the complex—again, depending upon the environment in which they are employed.

For instance, where the molecular complex comprises polyorganosiloxane and hydrocarbon complexors, and is employed with a polyorganosiloxane release agent—e.g., as part of a treating composition, for instance a release agent or release agent composition—in a toner fusing process using a hydrocarbon-based toner, then the polyorganosiloxane and hydrocarbon complexors act as release agent and wetting agent molecules, respectively. Specifically, the hydrocarbon complexor acts as wetting agent for the toner.

As another example, where the molecular complex as indicated is employed instead with a hydrocarbon release agent and a fuser member comprising a silicone rubber fusing surface, it is the hydrocarbon complexor that acts as the release agent molecule, and the polybrganosiloxane complexbr acts rather as the wetting agent molecule—here, for the fusing surface. In this regard, the hydrocarbon release agent of itself will tend not to wet the silicone surface, and accordingly the polyorganosiloxane complexor facilitates the desired wetting.

With fuser members having fluorocarbon fusing surfaces, fluorocarbon complexors and perfluoropolyether complexors will serve a wetting agent function in the complex. As discussed, because of their expense, it is unlikely that fluorocarbons and perfluoropolyethers would be employed as release agents for toner fusing processes, though indeed they can be included—with molecular complexes of the invention—in the treating compositions for this purpose.

Polyorganosiloxane and organomer complexors comprise polyorganosiloxanes and organomers, respectively, having at least one complexing moiety, as these are discussed herein—i.e., having one of these moieties, or having two or more of these moieties. Polyorganosiloxane and organomer, including hydrocarbyl and perhalopolyether, blocks are respectively derived from the corresponding polyorganosiloxane and organomer, including hydrocarbon and perhalopolyether, complexors.

A molecular complex of the invention can comprise, for instance, a complexed functionality formed by two polyorganosiloxane complexors—i.e., with the functionality formed by a complexing acid functional group of one polyorganosiloxane and a complexing base functional group of the other—and/or a complexed functionality thusly formed by two hydrocarbon complexors, and/or a completed functionality thusly formed by two perhalopolyether complexors. In each of these cases, the two complexed molecules can have the same or different chemical structures and the same or different molecular weights; even where both structure and molecular weight are the same, there is benefit in having identical complexors present, because of their different—i.e., acid functional and base functional—completing groups; specifically, the benefit of having both groups, as discussed, is realized here.

Polyorganosiloxane blocks of the invention, which can also be referred to as release blocks, include linear blocks and branched blocks. Preferred polyorganosiloxane blocks are polydimethylsiloxane blocks—i.e., derived from the corresponding polydimethylsiloxane complexors.

The polyorganosiloxane blocks of the present invention include homopolymer blocks and copolymer blocks of dimethylsiloxane, diphenylsiloxane, methyl-3,3,3-trifluoro-propylsiloxane, and methylphenylsiloxane monomeric units. Preferred polyorganosiloxane blocks include polydimethylsiloxane, polyphenylmethylsiloxane, polydiphenylsiloxane, poly(diphenyl-co-dimethyl)siloxane, and poly(phenylmethyl-co-diphenyl)siloxane, with polydimethylsiloxane being most preferred.

Polyorganosiloxane blocks and complexors of the invention preferably have a molecular weight of from about 2,000 to about 250,000. More preferably, polyorganosiloxane blocks and complexors of the invention have a molecular weight of from about 4,000 to about 120,000, and still more preferably of from about 6,000 to about 80,000.

Suitable polyorganosiloxane complexors include linear polyorganosiloxane complexors having one complexing moiety, and linear polyorganosiloxane complexors having two or more complexing moieties. Branched polyorganosiloxane complexors having one complexing moiety, and branched polyorganosiloxane complexors having two or more complexing moieties, also may be used.

It is preferred that the covalent linkage, to the polyorganosiloxane block, be stabilized against intra-molecular reaction. A means for achieving this objective is to utilize a complexing moiety which separates the complexing functional group from the polyorganosiloxane block by at least three carbon atoms, and particularly by at least three methylene units—especially in the case of complexing acid functional groups, and in the case of completing base functional groups, and with halo functional groups as well.

Accordingly, preferred completing moieties for the polyorganosiloxane complexors comprise $C_3$ and greater hydrocarbyl spacer groups, and particularly $C_3$ and greater alkyl spacer groups, connecting the complexing functional groups to the polyorganosiloxane blocks. Of these, the n-alkyl spacer groups are especially preferred, with the n-propyl spacer group being most preferred.

Specifically, preferred complexing acid and base functional moieties for the polyorganosiloxane complexors comprise acid and base functional $C_3$ and greater hydrocarbyl groups, and especially acid and base functional $C_3$ and greater alkyl groups, with the acid and base functional $C_3$–$C_{10}$ hydrocarbyl groups, and especially the $C_3$–$C_{10}$ alkyl groups being particularly preferred, and the acid and base functional $C_3$ and greater (such as $C_3$–$C_{10}$) n-alkyl groups, especially n-propyl groups with the acid or base functional group bonded to the terminal C atom—e.g., 3-aminopropyl ($H_2NCH_2CH_2CH_2$—) and 3-carboxypropyl ($HOOCCH_2CH_2CH_2$—)—being most preferred.

Among the linear polyorganosiloxane complexors that may be used are those with one or more pendant or side complexing moieties and/or one or more terminating complexing moieties. In this regard, it is understood that pendant, or side, complexing moieties are attached along the polyorganosiloxane backbone, to nonterminal siloxy units, and that terminating complexing moieties are attached on the polyorganosiloxane backbone, to terminal siloxy units.

Further as to linear polyorganosiloxane complexors, those that may be used include linear polyorganosiloxanes having a single complexing moiety which is a terminating moiety—i.e., with this complexing moiety attached to one terminal siloxy unit of the corresponding polyorganosiloxane block, and thereby terminating one end of the linear complexor. Also suitable as complexors are linear poly-organosiloxanes with two complexing moieties, both of which are terminating moieties—i.e., having one of the complexing moieties attached at either terminal siloxy unit of the corresponding polyorganosiloxane block, and thereby terminating both ends of the linear complexor.

Yet additionally as to linear polyorganosiloxane complexors, those that may be used include complexors having the formula

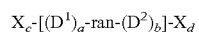

$X_c\text{-}[(D^1)_a\text{-ran-}(D^2)_b]\text{-}X_d$ wherein

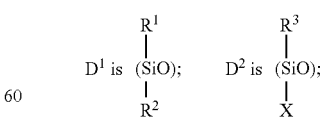

$D^1$ is (SiO); $D^2$ is (SiO);

with $R^1, R^2$ as substituents on $D^1$ and $R^3, X$ as substituents on $D^2$.

$R^1$, $R^2$, and $R^3$ are the same or different, and are selected from the group consisting of $C_1$–$C_{10}$ hydrocarbyl groups;
X is a completing moiety;
a is 40 to 2500;
b is 0 to 4;

c is 0 or 1;
d is 0 or 1; and
b+c+d is 1 to 4.

Preferably $R^1$, $R^2$, and $R^3$ are methyl groups, a is 60 to 2000, b is 0 to 1, and b+c+d is 1 or 2.

Branched polyorganosiloxane complexors that may be used include those having the formula

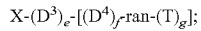

and being endcapped by

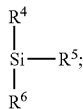

wherein
$X\text{-}(D^3)_e$ is a linear moiety;
$[(D^4)_f\text{-ran-}(T)_g]$ is a branched moiety;

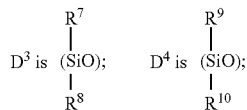

$R^4, R^5, R^6, R^7, R^8, R^9, R^{10}$, and $R^{11}$ are the same or different, and are selected from the group consisting of $C_1$–$C_{10}$ hydrocarbyl groups;
X is a complexing moiety;
T is $(R^{11})_h SiO_{(4-h)/2}$;
e is 1 to 300;
f is 25 to 5000;
g is 2 to 100; and
h is 0 or 1.

Branched polysiloxanes, particularly monofunctional branched polysiloxanes, disclosed in U.S. Provisional Patent Application No. 60/305,874, filed Jul. 18, 2001, are suitable branched polyorganosiloxane complexors for the present invention. Further, the process disclosed therein for preparing branched polysiloxanes are suitable for preparing branched polyorganosiloxane complexors for the present invention.

Additional preferred complexing moieties for the polyorganosiloxane complexors, particularly for the branched polyorganosiloxane complexors having the formula $X\text{-}(D^3)_e\text{-}[(D^4)_f\text{-ran-}(T)_g]$, as discussed herein, are those comprising carboxy, as well as primary amino, functional first moieties having the formula

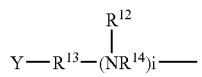

wherein
$R^{12}$ is selected from the group consisting of the H atom and $C_1$–$C_{10}$ hydrocarbyl groups;
$R^{13}$ and $R^{14}$ are the same or different, and are selected from the group consisting of $C_1$–$C_{10}$ hydrocarbyl groups;
Y is selected from the group consisting of $H_2N$— and HOOC—; and
i is 0 to 5.

Functional groups disclosed in U.S. Provisional Application No. 60/305,874, and identified therein by the variable X, are suitable as complexing moieties for the present invention.

Specifically regarding primary amino functional polyorganosiloxanes, polysiloxanes disclosed in U.S. Pat. Nos. 5,489,482, 5,512,409, 5,516,361, 5,531,813, and 5,925,779—these patents being incorporated herein in their entireties, by reference thereto—are suitable polyorganosiloxane complexors for the present invention. Further, the processes disclosed in these patents may be used to prepare polyorganosiloxane complexors for the present invention.

Yet further as to both primary amino functional and carboxy functional polyorganosiloxane complexors, polydimethylsiloxanes which may be used include α-aminopropyl-dimethylsiloxy, ω-trimethylsiloxy terminated polydimethyl-siloxanes, α,ω-aminopropyldimethylsiloxy terminated poly-dimethylsiloxanes, α-carboxypropyldimethylsiloxy, ω-tri-methylsiloxy terminated polydimethylsiloxanes, and α,ω-carboxypropyldimethylsiloxy terminated polydimethyl-siloxanes. These primary amino functional and carboxy functional polydimethylsiloxane complexors preferably have a molecular weight of from about 4,000 to about 120,000, more preferably of from about 6,000 to about 80,000, and still more preferably of from about 8,000 to about 40,000. Commercially available polydimethylsiloxanes that may be used as complexors include PS513 and PS510 α,ω-aminopropyl-dimethylsiloxy terminated polydimethylsiloxanes, and PS563 α,ω-carboxypropyldimethylsiloxy terminated polydimethyl-siloxane, from United Chemical Technologies, Inc., Bristol, Pa.

Hydrocarbyl blocks of the invention include linear blocks and branched blocks. Preferred hydrocarbyl blocks are nonsubstituted hydrocarbyl blocks—particularly, consisting or consisting essentially of carbon and hydrogen atoms, and derived from the corresponding nonsubstituted hydrocarbon complexors—with alkyl blocks, such as lauryl and stearyl groups, being particularly preferred. Also preferred are nonhalogenated hydrocarbyl blocks, especially nonhalogenated alkyl blocks, and nonfluorinated hydrocarbyl blocks, especially nonfluorinated alkyl blocks, are particularly preferred—particularly, here also, blocks derived from the corresponding hydrocarbon complexors.

Suitable hydrocarbon cbmplexors of the invention, and accordingly the hydrocarbyl blocks derived therefrom, include hydrocarbon waxes and oils. These include hydrocarbons that are oils at 25° C., and still liquid at operating temperatures, particularly fusing process temperatures, and hydrocarbons that are waxes at 25° C., but liquid at operating temperatures, particularly fusing process temperatures.

Among the hydrocarbyl blocks and hydrocarbon complexors which can be used are hydrocarbyl blocks, such as hydrocarbyl chains, and hydrocarbon complexors, such as hydrocarbon complexor chains, comprising at least about 8 C atoms, more preferably at least about 16 C atoms, still more preferably at least about 22 C atoms, still more preferably at least about 30 C atoms, and still more preferably about 40 C atoms, or at least about. 40 atoms. Also among the hydrocarbyl blocks and hydrocarbon complexors which can be used are hydrocarbyl blocks, such as hydrocarbyl chains, and hydrocarbon complexors, such as complexor chains, comprising from about 8 to about 600 C atoms, more preferably from about 16 to about 500 C atoms, still more preferably from about 22 to about 400 C atoms, still more preferably from about 30 to about 400 C atoms, and still more preferably from about 40 to about 400 C atoms. The hydrocarbon complexors, and the corresponding hydrocarbyl blocks, may be subject to minor modification, such as a small degree of, or slight, oxidation.

Particular hydrocarbyl blocks which are suitable are polyethylene blocks. Polyethylene blocks and complexors of the invention preferably have a molecular weight of from about 300 to about 10,000. Polyethylene complexors that may be used include those which are solid at 25° C., but liquid at operating temperatures, particularly fusing process temperatures.

Halocarbyl (especially haloalkyl) blocks also are suitable hydrocarbyl blocks of the invention. Preferred haloalkyl blocks are the perhaloalkyl blocks, especially the perfluoroalkyl blocks, such as the perfluorodecanyl and perfluorotetradecanyl groups.

Particularly as to fluorocarbyl blocks, the presence of these improves the wetting—by molecular complexes of the invention—of fuser member surfaces which themselves are fluorinated, or include fluorine substituents, as discussed. Examples of these surfaces are those comprising polyfluorocarbons. Suitable polyfluorocarbons include fluoroelastomers. Also included are nonelastomeric fluorocarbon materials, such as fluoroplastics and fluororesins, like polytetrafluoroethylene (PTFE), and copolymers of tetrafluoroethylene (TFE) and perfluoroalkylvinylether (PFA), and fluorinated ethylene propylene copolymers. However, fluorocarbon complexors are characterized by higher surface activity, and the complexors have relatively lower compatibility, particularly with polyorganosiloxanes. For this reason, preferably the fluorocarbyl blocks are somewhat smaller in size.

Specifically, the halocarbyl blocks and halocarbon complexors, such as perhaloalkyl blocks and perhaloalkane complexors, preferably comprise from about 4 to about 50 C atoms. More preferably, the halocarbyl blocks and halocarbon complexors, such as perhaloalkyl blocks and perhaloalkane complexors, comprise from about 6 to about 30 C atoms; still more preferably, from about 8 to about 20 C atoms.

Particularly as to the perfluoroalkyl blocks, those comprising an even number of carbon atoms are simple irritants. However, there are perfluoroalkyl blocks with odd numbers of carbon atoms that are known to be toxic. Accordingly, the even number blocks are preferred.

Preferably, the hydrocarbon complexors are low vapor pressure, nontoxic, nonsensitizing molecules. Suitable hydrocarbon complexors include linear hydrocarbon complexors having one complexing moiety, and linear hydrocarbon complexors having two or more complexing moieties. Branched hydrocarbon complexors having one complexing moiety, and branched hydrocarbon complexors having two or more complexing moieties, also may be used.

Among the linear hydrocarbon complexors that may be used are those with one or more pendant or side complexing moieties and/or one or more terminating complexing moieties. In this regard, it is understood that pendant, or side, complexing moieties are attached along the hydrocarbon backbone, to nonterminal C atoms, and that terminating complexing moieties are attached on the hydrocarbon backbone, to terminal C atoms.

Further as to linear hydrocarbon complexors, those that may be used include linear hydrocarbons having a single complexing moiety which is a terminating moiety—i.e., with this complexing moiety attached to one terminal C atom of the corresponding hydrocarbyl block, and thereby terminating one end of the linear complexor. Also suitable as complexors are linear hydrocarbons with two complexing moieties, both of which are terminating moieties—i.e., having one of the terminating complexing moieties attached at either terminal C atom of the corresponding hydrocarbyl block, and thereby terminating both ends of the linear complexor.

A commercially available hydrocarbon suitable for use as a complexor is Unicid®700, a carboxy functional hydrocarbon from Baker Petrolite, Sand Springs, Okla.

Further regarding carboxy functional hydrocarbon complexors, those which are suitable include the fatty acids, such as the $C_4$–$C_{30}$, and preferably the $C_{12}$–$C_{24}$ fatty acids. The saturated, monounsaturated, and polyunsaturated fatty acids may be used, with saturated being preferred.

Particularly as to the saturated, monounsaturated, and polyunsaturated fatty acids, those with a single carboxyl group at one end of the chain are preferred. Of these, especially preferred are the saturated monocarboxylic fatty acids, with the most preferred being those having the formula $$H_3C(CH_2)_nCOOH$$

wherein n is 4 to 28.

Also preferred are the saturated, monounsaturated, and polyunsaturated fatty acids with two carboxyl groups, one ate each end of the chain. Of these, particularly preferred are the saturated dicarboxylic fatty acids, with the most preferred being those having the formula $$HOOC(CH_2)_nCOOH$$

wherein n is 4 to 28.

Particular fatty acids that may be used include lauric acid, stearic acid, eicosanoic acid, docosanoic acid, tetracosanoic acid, and tricontanoic acid.

As to the perfluoroalkanoic, or perfluorocarboxylic acids, the saturated monocarboxylic acids, with the single carboxyl group at one end of the chain, are preferred. Particularly preferred are those having the formula $$F_3C(CF_2)_nCOOH$$

wherein n is 4 to 28.

Further preferred of the perfluoroalkanoic acids are the saturated dicarboxylic acids, with one of the two carboxyl groups at each end of the chain. Especially preferred are those having the formula $$HOOC(CF_2)_nCOOH$$

wherein n is 4 to 28.

Particular perfluoroalkanoic acids that may be used include perfluorotetradecanoic acid and perfluorodecanoic acid.

Sulfonic acid functional hydrocarbon complexors that may be used include $C_4$–$C_{30}$ sulfonic acids, and preferably the $C_{12}$–$C_{24}$ sulfonic acids. The saturated, monounsaturated, and polyunsaturated sulfonic acids may be used, with saturated being preferred. Particularly, the saturated, monounsaturated, and polyunsaturated aryl-alkyl sulfonic acids may be used, with saturated also being preferred here.

With respect to the saturated, monounsaturated, and polyunsaturated sulfonic acids, those with a single sulfonic acid group at one end of the chain are preferred. Of these, especially preferred are the saturated monosulfonic acids, with the most preferred being those having the formula $$H_3C(CH_2)_nSO_3H$$

wherein n is 4 to 28.

Also preferred are the saturated, monounsaturated, and polyunsaturated sulfonic acids with two sulfonic acid groups, one at each end of the chain. Of these, particularly preferred are the saturated disulfonic acids, with the most preferred being those having the formula $HO_3S(CH_2)_nSO_3H$ wherein n is 4 to 28.

Particularly as to the saturated, monounsaturated, and polyunsaturated aryl-alkyl sulfonic acids, those with a single sulfonic acid group are preferred. Of these, especially preferred are the saturated monosulfonic acids, with the most preferred being those having the formula $H_3C(CH_2)_nC_6H_4SO_3H$ wherein n is 1 to 28.

A particular saturated aryl-alkyl sulfonic acid that may be used is dodecylbenzenesulfonic acid. A suitable source for this sulfonic acid functional hydrocarbon complexor is Aldrich® Chemical, Milwaukee, Wis.

As to the perfluoroalkyl sulfonic acids, the saturated monosulfonic acids, with the single sulfonic acid group at one end of the chain, are preferred. Particularly preferred are those having the formula $F_3C(CF_2)_nSO_3H$ wherein n is 4 to 28.

Additional preferred monosulfonic acids are those having a short alkyl group between the perfluoroalkyl and the sulfonic acid group. Especially preferred are those having the formula $F_3C(CF_2)_nR^{15}SO_3H$ wherein n is 0 to 28, $R^{15}$ is selected from the group consisting of $C_1$–$C_{40}$ hydrocarbyl groups—particularly $C_1$–$C_{40}$ alkyl groups, and most especially $C_1$–$C_{40}$ n-alkyl groups—and the $F_3C$, $CF_2$, and $R^{15}$ groups contain a total of at least 4 carbon atoms.

Further preferred of the perfluoroalkyl sulfonic acids are the disulfonic acids, with one of the two sulfonic groups at each end of the chain. Especially preferred are those having the formula $HO_3SR^{16}(CF_2)_nR^{17}SO_3H$ wherein n is 2 to 28, $R^{16}$ and $R^{17}$ are the same or different, and are selected from the group consisting of $C_1$–$C_{40}$ hydrocarbyl groups—particularly $C_1$–$C_{40}$ alkyl groups, and most especially $C_1$–$C_{40}$ n-alkyl groups—and the $CF_2$, $R^{16}$ and $R^{17}$ groups contain a total of at least 4 carbon atoms.

Particular perfluoroalkyl sulfonic acids that may be used include heptadecafluorooctanesulfonic acid and perfluorohexylethylsulfonic acid, as well as Zonyl® TBS fluorosulfonic acid surfactant, from DuPont Performance Chemicals, Wilmington, Del.

Perhalopolyether blocks of the invention include linear blocks and branched blocks. Perhalopolyether blocks include homopolymer blocks and copolymer blocks of perhalocarboxy monomeric units.

Suitable perhalocarboxy monomeric units include $C_1$ and greater perhalocarboxy monomeric units, especially $C_1$ and greater perhaloalkoxy monomeric units, with the $C_1$–$C_{10}$ perhalocarboxy monomeric units, and especially the $C_1$–$C_{10}$ perhaloalkoxy monomeric units, being particularly preferred. Particular monomeric units that may be used include the perfluoromethoxy (—$OCF_2$—), perfluoroethoxy (—$OCF_2CF_2$—), perfluoropropoxy (—$OCF_2CF_2CF_2$—), perfluoroisopropoxy (—$OCF(CF_3)CF_2$—), perfluorobutoxy (—$OCF_2CF_2CF_2CF_2$—), perfluorosec-butoxy (—$OCF(CF_3)CF_2CF_2$—), and perfluoroisobutoxy (—$OCF_2C(CF_3)_2$—) monomeric units.

Like the indicated fluorocarbyl blocks, perfluoropolyether blocks improve the wetting—by molecular complexes of the invention—of fuser member surfaces that themselves are fluorinated, or include fluorine substituents, as discussed.

Perhalopolyether blocks and complexors of the invention preferably have a molecular weight of from about 200 to about 12,000. More preferably, perhalopolyether blocks and complexors of the invention have a molecular weight of from about 400 to about 8,000, and still more preferably of from about 600 to about 4,000.

Suitable perhalopolyether complexors include linear perhalopolyether complexors having one or two complexing moieties. Branched perhalopolyether complexors having one completing moiety, and branched perhalopolyether complexors having two or more completing moieties, also may be used.

Particularly as to linear perhalopolyether complexors, those that may be used include linear perhalopolyethers having a single complexing moiety which is a terminating moiety—i.e., with this complexing moiety attached to one terminal perhalocarboxy unit of the corresponding perhalopolyether block, and thereby terminating one end of the linear complexor. Also suitable as complexors are linear perhalopolyethers with two complexing moieties, both of which are terminating moieties—i.e., having one of the completing moieties attached at either terminal perhalocarboxy unit of the corresponding perhalopolyether block, and thereby terminating both ends of the linear complexor.

As to the foregoing, terminating moieties preferably are attached particularly to terminal C atoms of perhalo-polyether blocks—e.g., to perhalomethylene, particularly (—$CF_2$—), groups. Further, terminal perhalocarboxy units that do not have attached complexing moieties can have suitable endcaps, or attached terminal groups. Among the groups suitable for this purpose are perhalomethyl, particularly (—$CF_3$), groups.

Commercially available perfluoropolyethers that are suitable complexors include the following, all from Ausimont USA, Inc., Thorofare, N.J.: Fomblin® Z-Diac, which is a dicarboxy functional perfluoropolyether, having two carboxyl groups, one terminating each end of the perfluoropolyether; Fomblin® MF-300, which is a monocarboxy functional perfluoropolyether, with a single carboxyl group terminating one end of the perfluoropolyether; and Fomblin® Z-Diol, which is a dihydroxy functional perfluoropolyether, having two hydroxyl groups, one terminating each end of the perfluoropolyether. Additional commercially available perfluoropolyethers that may be used are Krytox 157 FS and Fluoroguard FSM, which are carboxy functional poly (hexafluoropropylene oxide) oils from E.I du Pont de Nemours and Company, Wilmington Del.

It is noted that preparing molecular complexes of the invention is simplified by the miscibility of the complementary complexing acid functional and base functional groups. This advantage is of particular value where one or more fluorocarbon and/or perfluoropolyether complexors is employed with nonfluorine containing (e.g., polyorganosiloxane) complexors.

Normally, utilizing fluorine containing materials with nonfluorine containing materials is difficult, because the former do not blend or mix well with the latter. Therefore, to achieve the desired reaction, it is often necessary to use extreme measures, such as employing exotic solvents that will solubilize both the fluorine and nonfluorine reactants. However, because of the interaction and improved mixing that characterizes acid and base functional complexing groups, the complexors readily complex—whether the fluorocarbon and/or perfluoropolyether complexor or complexors comprise acid and/or base functional complexing groups.

Where the molecular complex of the invention includes one or more polyorganosiloxane complexors, and where the molecular complex of the invention includes one or more organomer complexors, the totality of the polyorganosiloxane complexors—i.e., the one or more polyorganosiloxane complexors—of the molecular complex of the invention, is referred to as the polyorganosiloxane component of the complex, and the totality of the organomer complexors—i.e., the one or more organomer complexors—is referred to as the organomer component. The organomer component can be a hydrocarbyl component—i.e., with all of the one or more organomer complexors being hydrocarbon complexors—or it can be a perhalopolyether component—i.e., with all of the one or more organomer complexors being perhalopolyether complexors—or it can include both one or more hydrocarbon complexors and one or more perhalopolyether complexors.

The polymer of the invention accordingly can comprise a hydrocarbyl component and/or a perhalopolyether component. And, for instance, the hydrocarbyl component can, comprise a halocarbyl component.

Discussion concerning organomer components applies to hydrocarbyl components and to perhalopolyether components.

Preferably the polyorganosiloxane component has a greater molecular weight than the organomer component. In this regard, the polyorganosiloxane component can be in the form of a single polyorganosiloxane complexor having a molecular weight greater than that of a single organomer complexor or the sum of multiple organomer. complexor molecular weights, or the polyorganosiloxane component can be in the form of multiple polyorganosiloxane organomers having a total molecular weight greater than that of a single organomer complexor or the sum of,multiple organomer complexor molecular weights.

Also as a matter of preference, the polyorgano-siloxane component comprises a majority of the molecular complex of the invention. Here, a majority means that the molecular weight of the polyorganfosiloxane component comprises more than 50 percent of the molecular weight of the complex.

As a matter of particular preference, the molecular complex of the invention is predominantly polyorganosiloxane—i.e., the polyorganosilbxane component is predominant. This predominance refers to the molecular weight of the polyorganosiloxane component comprising at least 75 percent of the molecular weight of the complex.

As to the relative sizes of the polyorganosiloxane and organomer complexors in a molecular complex of the invention, preferably the polyorganosiloxane complexor molecular weight is greater than the organomer complexor molecular weight. In the case of hydrocarbon complexors, the mole ratio of polyorganosiloxane complexor Si atoms to organomer complexor C atoms is greater than about 1:3; this ratio more preferably is from about 1:1 to about 40:1, still more preferably from about 1:1.5 to about 30:1, and still more preferably from about 2:1 to about 20:1—particularly in the case of polydimethylsiloxane complexors (i.e., with dimethylsiloxy units) and alkyl complexors (i.e., having methylene units).

Further as to this matter, particularly in the case of halocarbon complexors, and most especially fluorocarbyl complexors, the mole ratio preferably is greater than about 1:1; this ratio more preferably is from about 1:1 to about 40:1, still more preferably from about 2:1 to about 140:1, and still more preferably from about. 3:1 to about 100:1, and still more preferably from about 4:1 to about 70:1. And particularly in the case of perhalopolyether complexors, and most especially perfluoropolyether complexors, the mole ratio of polyorganosiloxane complexor Si atoms to perhalopolyether complexor C atoms preferably is greater than about 1:3; this-ratio more preferably is from about 1:1 to about 140:1, still more preferably from about 1.5:1 to about 100:1, and still more preferably from about 2:1 to about 70:1.

Additionally in the case particularly of polydimethylsiloxane and alkyl complexors, preferably the polydimethylsiloxane complexor to alkyl complexor molecular weight ratio is from about 5:1 to about 400:1, more preferably from about 8:1 to about 100:1, still more preferably from about 12:1 to about 55:1, still more preferably from about 15:1 to about 30:1. Particularly with polydimethylsiloxane and fluoroalkyl complexors, preferably the polydimethylsiloxane to fluoroalkyl complexor molecular weight ratio is from about 5:1 to about 400:1, more preferably from about 7:1 to about 150:1, still more preferably from about 9:1 to about 75:1, still more preferably from about 11:1 to about 40:1.

It is believed that polyorganosiloxane, hydrocarbon, and perfluoropolyether complexors, employed in molecular complexes of the invention, have advantageous effects in facilitating the combating of toner offset and toner buildup on fuser members.

In this regard, hydrocarbon complexors are thought to exhibit surfactant-like behavior, and to interact with nonpolar surfaces, like the fusing process toner. Waxy hydrocarbon complexors, by virtue of their waxy nature, lubricate toner, and allow it to peel from surfaces without offset.

Polyorganosiloxane complexors likewise are thought to exhibit surfactant-like behavior. Where the molecular complex of the invention includes a polyorganosiloxane component, and is employed with polyorganosiloxane release agent—e.g., as part of a treating composition—the polyorganosiloxane component of the complex is further thought to promote wetting of the surfaces by the release agent.

This is particularly the case where polyorganosiloxane release agent, as discussed, comprises about 50 percent by weight or more, and even 75 percent by weight or more, of the composition. In such instance, even where the complex of the invention comprises a comparatively minor portion by weight of the release agent composition, it promotes wetting of fuser member surfaces by the composition; and this is especially the case where the complex further comprises a fluorocarbyl component and/or a perfluoropolyether component, and most especially where, yet additionally, the fuser member surface to which the composition is applied is fluorinated, or includes fluorine substituents—e.g. comprises polyfluoro-carbon, or is provided by a polyfluorocarbon fusing surface layer. With respect to the foregoing, silicones—poly-organosiloxanes—are known in the art to be particularly useful as release agents, and the polyorganosiloxane component further promotes release of the toner from surfaces without offset.

And yet additionally with regard to employing the molecular complex of the invention—as indicated—with polyorganosiloxane release agent, and with the complex including one or more polyorganosiloxane complexors along with one or more fluorocarbon complexors and/or one or more perfluoropolyether complexors, the polyorganosiloxane component, by its bonding with the fluorine-containing complexor or complexors, stabilizes this complexor or complexors. In this regard, ordinarily fluorine-containing materials—as discussed—do not blend or mix well with nonfluorine-containing materials. However, because of this stabilization, separation of the fluorocarbon and/or perfluoropglyether from the composition is minimized.

The invention further pertains to a complex comprising at least one first complexor molecule, or first complexor, and at least one second complexor molecule, or second complexor. This molecular complex also comprises at least one complexed functionality.

The at least one first complexor comprises at least one member selected from the group consisting of polyorganosiloxanes, hydrocarbons, and perhalopolyethers, and at least one first complexing moiety that comprises a first complexing functional group. The at least one second complexor also comprises at least one member selected from the group consisting of polyorganosiloxanes, hydrocarbons, and perhalopolyethers, and at least one second complexing moiety that comprises a second complexing functional group.

The first complexing functional group comprises one of a complexing acid functional group and a complexing base functional group, and the second complexing functional group comprises the other of the complexing acid functional group and the complexing base functional group. The at least one complexed functionality comprises the complexing acid functional group and the complexing base functional group, bonded by a noncovalent bond.

The noncovalent bond has a bond energy of at least about 20 kJ/mol—more preferably of at least about 30 kJ/mol, and still more preferably of at least about 35 kJ/mol. The bond energy of the noncovalent bond preferably also is less than 150 kJ/mol. Yet additionally as a matter of preference, the noncovalent bond is an ionic bond or a hydrogen bond.

The first and second molecules as discussed are suitable as first complexors, and as second complexors. Likewise, the polyorganosiloxane, hydrocarbon, and perfluoropolyether complexors as discussed are suitable as first complexors, and as second complexors.

The treating composition of the invention is, or consists of, or consists essentially of, or consists substantially of, or comprises, one or more of the molecular complexes of the invention. In this regard, molecular complexes of the invention have utility as treating compositions or as additives, or components, or ingredients—particularly, as active ingredients—in treating compositions.

Particularly, molecular complexes of the invention can be used neat, or together with one or more other components or ingredients. For example, in addition to one or more molecular complexes of the invention, the treating composition can comprise one or more release agents, especially one or more polymeric release agents.

Among the foregoing release agents are polyorganosiloxane release agents; polyorganosiloxanes which may be used include those endcapped by trimethylsiloxy groups. Also suitable are hydrocarbon release agents, particularly polyethylene release agents, and. perhalopolyether release agents; perhalopolyethers which may be used include those endcapped by perhalomethyl units.

Molecular complexes of the invention comprising a hydrocarbyl component are particularly suitable for use with hydrocarbon release agents. Correspondingly, molecular complexes of the invention comprising perhalopolyether or polyorganosiloxane components are particularly suitable for use with perhalopolyether or polyorganosiloxane release agents, respectively.

Hydrocarbon release agents which may be used include polyethylenes, such as those that are solid at 25° C., but liquid. at operating temperatures, particularly fusing process temperatures. Preferred polyethylenes are those having a molecular weight of from about 300 to about 10,000.

Perhalopolyether release agents which may be used include perhalopolyether homopolymers and copolymers comprising perhalocarboxy monomeric units as discussed. Perhalopolyethers which may be used include those endcapped by perhalomethyl groups.

Commercially available perfluoropolyethers that are suitable for use as release agents include the following: Krytox, from E.I. du Pont de Nemours and Company, Deepwater, N.J.; Fomblin® Y45, YR, and YPL1500, from Ausimont USA, Inc.; and Galden® HT230, HT250, HT270, also from Ausimont USA, Inc.

Though perfluoropolyethers as indicated indeed are suitable as release agents, their use for this purpose is not preferred, due to cost considerations. Halocarbons also are not preferred for the same reason, though these are among the hydrocarbons which can be used as release agents.

Suitable polyorganosiloxanes include polyorgano-siloxane fluids, such as oils and liquids—particularly those that are oils and liquids at 25° C. Polyorganosiloxanes that can be used also include those that are solid at 25° C., but liquid at operating temperatures, particularly fusing process temperatures. In this regard, it is understood that the use of release agents that are solid at ambient temperatures but liquid under use conditions require specialized delivery systems, as are known in the art.

Preferred polyorganosiloxanes are those that are liquid at fusing process temperatures, and more preferably have an ambient temperature viscosity of from about 100 centistokes to about 500 centistokes or to about 100,000 centistokes, still more preferably from about 350 centistokes to about 100,000 centistokes, or from about 500 or 501 centistokes to about 70,000 centistokes, or from about 10,000 centistokes to about 80,000 centistokes, or from about 10,000 centistokes to about 100,000 centistokes, with the viscosity dropping at the elevated temperatures employed in the fusing process. Where polyorganosiloxane viscosity is discussed without indication of whether the ambient temperature liquids or solids are intended, then it is understood that in the case of the liquids the viscosity is ambient temperature viscosity, while for solids it is viscosity at operating temperatures, particularly fusing process temperatures.

Of the polyorganosiloxanes, the nonfunctional polyorganosiloxanes, particularly the nonfunctional poly-dimethylsiloxanes, are preferred. Commercially available nonfunctional polydimethylsiloxanes which may be used are the DC200® polydimethylsiloxanes, from Dow Corning Corporation, Midland, Mich.

Functional polyorganosiloxanes also may be used. One reason for employing functional polyorganosiloxanes is to enhance interaction of the release agent with the fuser member surface, or with material such as filler incorporated therein.

Particular functional polyorganosiloxanes which may be used include those disclosed in U.S. Pat. Nos. 4,011,362, 4,046,795, and 4,264,181; these patents also are incorporated herein in their entireties, by reference thereto. Still further functional polyorganosiloxanes which may be used are the mercapto functional polyorganosiloxanes, such as those disclosed in U.S. Pat. No. 4,029,827, and the polyorganosiloxanes having functional groups such as carboxy, hydroxy, epoxy, amino, isocyanate, thioether, and (as indicated) mercapto functional groups, such as those disclosed in U.S. Pat. Nos. 4,101,686 and 4,185,140; yet additionally these patents are incorporated herein in their entireties, by reference thereto.

Suitable functional polyorganosiloxanes include those with one or more pendant functional groups and/or one or two terminating functional groups—it also being understood that pendant groups are side groups, or moieties attached along the backbone of the polymer chain, to monomeric units that are not terminal monomeric units of the chain (i.e., that are nonterminal monomeric units thereof), and terminating groups are end groups, or moieties attached on the backbone of the polymer chain to terminal monomeric units at the polymer chain ends. Particularly preferred functional polyorganosiloxanes are the monofunctional polyorganosiloxanes—these being polyorganosiloxanes having one functional group per molecule or polymer chain. Suitable monofunctional polyorganosiloxanes include those wherein the sole functional group is a side group; however, the preferred monofunctional polyorganosiloxanes are those which are functional group terminated—i.e., wherein the sole functional group is at an end of the polymer chain.

The more preferred release agents with functional groups are the mercapto functional polyorganosiloxane release agents and the amino functional polyorganosiloxane release agents. Particularly preferred are the release agents, including mecapto functional polyorganosiloxane release agents, consisting of, consisting essentially of, consisting substantially of, or comprising monomercapto functional polyorganosiloxanes, or polyorganosiloxanes having one mercapto functional group per molecule or polymer chain. Also particularly preferred are release agents, including amino functional polyorganosiloxane release agents, consisting of, consisting essentially of, consisting substantially of, or comprising monoamino functional polyorganosiloxanes, or polyorganosiloxanes having one amino functional group per molecule or polymer chain. In this regard, the release agents disclosed in U.S. Pat. Nos. 5,531,813 and 6,011,946 may be used; these patents are incorporated herein in their entireties, by reference thereto.

The treating composition accordingly can comprise, in addition to one or more molecular complexes of the invention, one or more nonfunctional polyorganosiloxanes, and/or one or more functional polyorganosiloxanes—particularly, as indicated, in the case of molecular complexes that comprise polyorganosiloxane components. The treating composition can be a blend or mixture of the indicated ingredients, and can be employed in the form of a blend or mixture, or these ingredients can be used separately in the toner fusing process of the invention. Where nonfunctional polyorganosiloxanes are included, they can serve as diluents for molecular complexes of the invention and for functional polyorganosiloxanes (if included), so as to lessen treating composition expense.

With reference to the blends and mixtures, the presence of the polyorganosiloxane component, as part of the molecular complex of the invention, promotes dispersal of the complex in the one or more nonfunctional and/or functional polyorganosiloxanes, and stabilizes the complex, thereby combating (e.g., preventing or at least inhibiting) settling—particularly where the complex of the invention serves as an additive. Without this polyorganosiloxane component of the complex, hydrocarbons, particularly waxy hydrocarbons, that are added to or combined with silicone or polyorganosiloxane liquids and oils, will tend to phase separate or precipitate. This will occur at ambient temperatures and at elevated temperatures; however, the tendency is particularly evident with cooling compositions.

In the release agent blends and mixtures, preferably the molecular complex of the invention is predominantly polyorganosiloxane—i.e., as a matter of preference, the polyorganosiloxane component of the complex is predominant. Because of this predominance, the complex of the invention more easily disperses in the one or more nonfunctional and/or functional polyorganosiloxanes, and thusly disperses more easily therein as an additive.

Where a treating composition blend or mixture includes a nonfunctional polyorganosiloxane, and where the molecular complex of the invention comprises a polyorganosiloxane component, and further comprises not more than 50 percent by volume of the blend or mixture, then preferably the polyorganosiloxane component, of the complex, has a similar, or even identical—or at least substantially or essentially identical—chemical structure to that of the nonfunctional polyorganosiloxane. As a matter of particular preference in this instance, both the nonfunctional polyorganosiloxane of the blend or mixture, and the polyorganosiloxane component—here, the one or more polyorganosiloxane blocks—of the molecular complex, are nonfunctional polydimethylsiloxanes.

However, if the treating composition comprises more than 50 percent by volume of the molecular complex of the invention, then it is not significant whether the indicated chemical structures are the same or different. In this instance, the molecular complex of the invention may be considered the primary component of the blend or mixture, and not an additive.

The foregoing as to similar and identical chemical structures also applies in the case of hydrocarbons and hydrocarbon components of the molecular complexes of the invention. Yet additionally, it applies in the case of perhalopolyethers and perhalopolyether components of the molecular complexes of the invention.

Treating composition blends and mixtures of the invention preferably have a viscosity from about 150 to about 100,000 cSt, and more preferably from about 200 to about 70,000 cSt, at 25° C.

Suitable treating compositions of the invention include those comprising about 30 percent or less by weight of the molecular complex of the invention. The compositions further can include polyorganosiloxanes, as discussed, particularly nonfunctional polyorganosiloxanes.

Particularly with the molecular complexes comprising, as discussed, a polyorganosiloxane component, a preferred treating composition of the invention comprises 4.4 percent by weight molecular complex of the invention, in a 60,000 cSt polydimethylsiloxane liquid. Another preferred treating composition of the invention comprises 12.5 percent by weight of the complex in a 350 cSt polydimethylsiloxane liquid. Preferably in these compositions, the molecular complex of the invention is dispersed in the polydimethylsiloxane liquid.

And where the complex comprises one or more halocarbyl complexors and/or one or more perhalopolyether complexors, the molecular complex of the invention will be effective even at very low levels. Here the polymer may comprise as little as about 1 percent by weight, or even 0.5 percent by weight, of the release agent composition.

Further in this regard, suitable release agent compositions of the invention include those comprising from about 0.5 percent to about 50 percent by weight molecular complex of the invention, in a nonfunctional polyorgano-siloxane having a viscosity of from about 100 cSt to about 160,000 cSt. More preferred are compositions comprising from about 2 percent to about 20 percent by weight molecular complex of the invention, in a nonfunctional polyorgano-siloxane having a viscosity of from about 200 cSt to about 100,000 cSt. Still more preferred are compositions comprising from about 4 percent to about 15 percent by weight molecular complex of the invention, in a nonfunctional polyorganosiloxane having a viscosity of from about 250 cSt to about 80,000 cSt.

Also suitable are release agent compositions comprising from about 1 percent to about 15 percent by weight molecular complex of the invention, and from about 1 percent to about 15 percent by weight functional polyorganosiloxane, in a nonfunctional polyorganosiloxane having a viscosity of from about 100 cSt to about 160,000 cSt—more preferably, of from about 200 cSt to about 80,000 cSt. Suitable functional polyorganosiloxanes for this purpose are the carboxy, amino, mercapto, silane, and phenol functional polyorganosiloxanes.

With respect to the foregoing, the preferred nonfunctional and functional polyorganosiloxanes are the nonfunctional and functional polydimethylsilbxanes.

The treating composition of the invention can be employed in the same manner as release agents conventionally are used in toner fusing systems. Specifically, the treating composition is applied to the surface of a fuser member, so that during the fusing process the treating composition contacts toner on the substrate, and can contact the substrate. The treating composition is accordingly transferred to the toner surface through contact with the fuser member surface. Preferably the treating composition is applied so as to form a film that completely, or at least essentially, or at least substantially, covers the fuser member surface. Also as a matter of preference, during the operation of the toner fusing system the treating composition is applied continuously, or at least essentially continuously, or at least substantially continuously, to the surface of the fuser member.

Further as to application, where the treating composition comprises more than one ingredient (e.g., two or more molecular complexes of the invention; or one or more molecular complexes of the invention, along with one or more nonfunctional polyorganosiloxanes, and/or one or more functional polyorganosiloxanes), the ingredients may be applied simultaneously to the fuser as a blend, or in separate applications using the same or multiple applicators. In the case of multiple applicators, the blend is produced on the fuser member surface.

Typical rates for application to substrate, in the case of paper, are less than 30 microliters (μl) per 8½" by 11" sheet. Application rates are limited by unwanted side effects, such as oil streaks, machine contamination during duplex printing, and oil spots.

Application to the fuser member may be by any suitable applicator, including release agent soaked web, pad, or impregnated roll. Preferably, a means that provides the indicated continuous application, such as a rotating wick oiler or a donor roller oiler, is employed.

A rotating wick oiler comprises a storage compartment for the release agent, or component thereof, and a wick for extending into this compartment. During operation of the toner fusing system of the invention, the wick is situated so as to be in contact with the stored release agent, or component thereof, and also with the fusing surface layer of the fuser member; the wick thusly picks up release agent, or component thereof, and transfers it to the fuser member.

A donor roller oiler is an applicator which includes a metering roller that takes up release agent, or component thereof, from its supply source, a metering blade, which can be a rubber, plastic, or metal blade, that skims excess from the metering roller, and a delivery roller that receives release agent or component thereof from the metering roller, and contacts the fuser member surface to apply release agent or component thereon.

The fuser and support members may be of the type as are generally employed in toner fusing processes. Internal and/or external heating may be employed, and heating means as are known in the art are suitable. Preferably, the means of providing heat for fusing toner and substrate comprise the heating of the fuser member by one or more external and/or internal heating sources, and transmission of this heat from the fuser member to the toner, or to both toner and substrate—preferably by contact.

The fuser member surface may be comprised of any suitable material or materials—preferably, a material or materials such as are conventional in the art. Among the materials that may be used are the polysiloxane elastomers, or silicone rubbers or elastomers; two appropriate commercially available silicone rubbers are Silastic™-J, from Dow Corning Corporation, and EC4952, from Emerson & Cuming ICI, Billerica, Mass. Further eligible materials are polyfluorocarbons, including the fluoroelastomers. Commercially available fluoroelastomers that may be used are those sold by Dupont Dow Elastomers, Stow, Ohio under the trademark Viton®, such as Viton® A, Viton® GF, etc. Also eligible are nonelastomeric fluorocarbon materials, such as fluoroplastics and fluororesins, like polytetrafluoro-ethylene (PTFE), and copolymers of tetrafluoroethylene (TFE) and perfluoroalkylvinylether (PFA), and fluorinated ethylene propylene copolymers; particularly, the fuser member may comprise a Teflon coating, or a PFA sleeve.

In an embodiment of the toner fusing process of the invention, the complexors may be applied separately to the fuser member surface, with the bonding that takes place between complexors occurring on the fuser member, and the heat of the fusing process facilitating the bonding. Separate application can be employed with complexors that, even at elevated temperatures, even fusing process temperatures, still only complex, rather than degrading or going further to covalently bond—for instance, in the case of primary amino and sulfonic acid functional polyorganosiloxane and organomer complexors, as discussed.

Separate application of the complexors also can be desirable in circumstances where the complexors which are being used comprise complexing functional groups that will go beyond complexing and undergo covalent bonding at and above a particular temperature, and where the toner fusing system preheats the treating composition—i.e., before application to the fuser member—to or past this temperature. Accordingly, separate application likewise is suitable with primary amino and carboxy functional polyorganosiloxane and organomer complexors, as discussed.

For instance, when a donor roller oiler is employed, the temperature of its delivery roller, and of treating composition on this delivery roller, will be elevated by contact with the surface of the heated fuser member. This heated treating composition may be recycled between delivery roller and storage compartment several times before reaching the fuser member surface. With molecular complexes that undergo covalent bonding at the higher temperatures, then because of the heating, functionalities of recycled treating composition that is ultimately applied to the fuser member will be in the covalently bonded form, rather than the desired complexed and covalently bondable configuration.

As another example, the storage compartment may be maintained at or above the covalent bonding temperature, even when the system is not delivering treating composition to the fuser member, in order to maintain more even application.

The point at which complexors combine can be controlled by where on the fusing surface the different complexors are applied. And by controlling the point of combination, the point of complexation correspondingly can be controlled.

The separate application preferably is provided by employing a separate applicator for each complexor. Controlling the place of complexor application to the fuser member—and thereby exerting the indicated control over point of combination and of complexation—can be effected by the positioning of applicators for different complexors.

The advantage provided by absence, or at least essential absence, of free primary amine, as discussed, also accrues where the complexors are separately applied. Specifically, it is preferred that all, or at least essentially all, of the primary amine groups be complexed on the fuser member, and it is accordingly preferred that no, or at least essentially no, uncomplexed primary amine groups leave the fuser member, or otherwise reach the substrate or toner thereon.

The indicated control over combination and complexation can be utilized to provide these desired results. Particularly, complexor application can be conducted to promote the desired reaction on the fuser member surface.

So when the base functional complexor comprises primary amino functional complexor, preferably the applicators are positioned so that primary amino functional complexor is applied before acid functional complexor, so that when acid functional complexor is applied, so that when acid functional complexor is applied, amino functional complexor is already on the fuser member surface. Additionally as a matter of preference, the indicated complexing acid excess is employed in this separate addition.

Any suitable applicators may be used, as may any configuration of multiple applicators which will provide the requisite separate application. For instance, dual applicator systems that are known in the art, such as that disclosed in U.S. Pat. No. 4,034,706, may be employed; this patent is incorporated herein in its entirety, by reference thereto.

The invention is illustrated by the following procedures; these are provided for the purpose of representation, and are not to be construed as limiting the scope of the invention. Unless stated otherwise, all percentages, parts, etc. are by weight.

Experimental Procedures

Materials Employed in the Procedures

Unicid®350, 425, 550, and 700 (487, 595, 772, and 888 grams per mole carboxylic acid, respectively), from Baker Petrolite α,ω-aminopropyldimethylsiloxy terminated polydimethyl-siloxanes, all from United Chemical Technologies, Inc.: PS510a and b (2260 and 1370 grams per mole amine, respectively); PS511 (3086 grams per mole amine); and PS513a, b, c, and d (11660, 9300, 6165, and 7575 grams per mole amine, respectively)

PS563 α,ω-carboxypropyldimethylsiloxy terminated polydimethylsiloxane, 31,200 grams per mole carboxylic acid, from United Chemical Technologies, Inc.

Stearic acid 98+%, perfluorodecanoic acid 95%, perfluorotetradecanoic acid 97%, perfluorosebacic acid, pentadecafluoroocatanoic acid 96%, and octylamine 99%, from Aldrich® Chemical 350, 1,000, and 60,000 centistoke DC200® poly-dimethylsiloxane, from Dow Corning Corporation Fomblin® MF-300 monocarboxy functional perfluoropoly-ether, approximately 650 grams per mole carboxylic acid, from Ausimont USA, Inc.

Zonyl® FS-62, a blend of perfluorohexylethylsulfonic and perfluorooctylethylsulfonic acids, their ammonium salts, water and acetic acid; contains approximately 0.000765 mols maximum sulfonic acid groups per gram; from Dupont Performance Chemicals FMS-123 poly(3,3,3-trifluoropropylmethylsiloxane), 300–350 centistokes, from Gelest, Inc., Morrisville, Pa.

Monoamino polydimethylsiloxane additive: α-aminopropyldimethylsiloxy, ω-trimethylsiloxy terminated polydimethylsiloxane, number average molecular weight of 12,000, amine equivalent of about 13,000 grams per mole amine Monothiol polydimethylsiloxane additive: α-thiol-propyldimethylsiloxy, ω-trimethylsiloxy terminated poly-dimethylsiloxane, viscosity of about 80 cSt, about 3,800 grams per mole thiol PFA film, 80 microns thickness, from Saint-Gobain Performance Plastics, Wayne, N.J.

COMPARATIVE EXAMPLE 1

2.666 grams of 1,000 cSt DC200® fluid and 0.13 grams of stearic acid were combined and melt blended, at a temperature of from about 80° C. to about 90° C., to form a clear liquid. On cooling, the stearic acid immediately precipitated from the silicone, forming granular crystals. The precipitated crystals remelted at the expected melting point for stearic acid (about 80° C.).

COMPARATIVE EXAMPLES 2–5

Table 1 below lists the ingredients, and amounts thereof, used to prepare the release fluids of Comparative Examples 2–5. As shown in Table 1, the Comparative Example 2 release fluid did not include an additive. Each of the other release compositions comprised 4.4 percent by weight additive in polydimethylsiloxane; this diluent was the 60,000 centistoke DC200®. The listed thiol, amine, and acid, were, respectively, the monothiol and monoamino polydimethylsiloxane additives, and the PS563.

TABLE 1

| Comparative Example | PDMS viscosity (cSt)* | Additive | Additive amount (grams) | 60K PDMS (grams) |
|---|---|---|---|---|
| 2 | 60,000 | None | None | 800 |
| 3 | 60,000 | Thiol | 36 | 764 |
| 4 | 60,000 | Acid | 36 | 764 |
| 5 | 60,000 | Amine | 36 | 764 |

*Measured using a Brookfield Viscometer, from Brookfield Engineering Laboratories, Stoughton, Ma Preparation of Complexes and Compositions of the Invention Complexed additives of the invention were prepared, and combined with diluent to provide treating compositions of the invention, as set forth in Examples 1–8.

EXAMPLE 1

2.606 grams of PS513b and 0.13 grams of stearic acid were combined and melt blended, at a temperature of from about 80° C. to about 90° C., to form a clear liquid. On cooling, the liquid remained clear for about 10 minutes, then a haze slowly developed, and the liquid solidified to a semisolid. The semisolid remelted at 50–55° C., significantly below the previously observed stearic acid melting point of about 80° C.

EXAMPLE 2

5 grams of PS510a and 1 gram of stearic acid were combined and heated at 80° C. for several minutes, and the product was subjected to Fourier transform infrared spectroscopy (IR). Infrared spectroscopy of the functional groups was used to determine the state of the reaction; the spectroscopy showed the disappearance of the stearic acid peak at 1700.

The foregoing reaction and analysis were repeated, but with an excess of stearic acid; specifically, 5 grams of PS510a and 1.5 grams of stearic acid were employed. Here, a small stearic acid peak at 1700 was observed. However, the spectra of the relevant compounds—i.e., the acid and amine reactants, and the prospective product—were difficult to observe, due to the high molecular weight of the PS510a, and the resulting low concentration of the compounds' functional groups. Therefore, in place of PS510a, octadecylamine—with a much lower molecular weight, and therefore a higher amine concentration—was employed as a model amine, and combined and heated with the stearic acid, so that the changes in infrared adsorption could be ascertained.

0.425 grams of octadecylamine and 0.468 grams of stearic acid were melted and combined at about 80° C. A sample measured by IR showed the disappearance of the amine peak at 3330, and the stearic acid peak at 1700. The mixture was further heated to 150° C., and sampled after 30 minutes, and again at 1 hour. IR showed the slow formation of an amide peak at 3310, and the stearic acid peak at about 1700 reappeared at a substantially reduced intensity.

As noted, with heating at the lower temperature, the acid and amine peaks were eliminated, but no amide was formed. However, amide and reduced intensity stearic acid peaks appeared at the higher temperature. Accordingly, the IR results clearly show that the higher temperature effected reaction of the amine and acid to produce amide, while at the lower temperature there was formation of a complex between the acid and amine groups.

EXAMPLE 3

0.81 grams of stearic acid and 40 grams of PS513b were combined and heated to about 80–85° C., with stirring, until melt blended, about 30 minutes total preparation time. No precipitation of the stearic acid was observed on cooling. 17.6 grams of the product were combined with 382.4 grams of 60,000 cSt DC200® oil, and blended at room temperature.

EXAMPLE 4

1.17 grams of stearic acid and 40 grams of PS513b were combined and heated at 80–85° C., with stirring, until melt blended. No gross precipitation of the stearic acid was observed on cooling; a slight haze was noted. 17.6 grams of the product were combined with 382.4 grams of 60,000 cSt DC200® oil, and blended at room temperature.

EXAMPLE 5

2.518 grams of Unicid®700 and 40 grams PS513b were combined in a flask and heated to about 110–115° C., with stirring, until melt blended, about 1–2 minutes after fully melting. 17.6 grams of the product were combined with 382.4 grams of 60,000 cSt DC200® oil, and blended at room temperature.

EXAMPLE 6

3.62 grams of Unicid®700 and 40 grams of PS513b were combined in a flask and heated to about 110–115° C., with stirring, until melt blended, about 1–2 minutes after fully melting. 17.6 grams of the product were combined with 382.4 grams of 60,000 cSt DC200® oil, and blended at room temperature.

EXAMPLE 7

19.2 grams of Unicid®700 and 21.989 grams of PS510b were combined in a flask and heated to about 115–118° C., with stirring, until melt blended, about 1–2 minutes after fully melting. The product, a waxy solid, was blended with 60,000 cSt DC200® fluid to prepare a 4.4 percent blend of the product.

EXAMPLE 8

6.196 grams of stearic acid and 22.735 grams of PS510b were combined in a flask and heated to about 80° C., with stirring, until melt blended. The product cooled to a semisolid, and was combined with 60,000 cSt DC200® fluid to, prepare a 4.4 percent blend of the product.

COMPARATIVE EXAMPLE 6

An amount of the Example 4 product was heated in an oven at 175° C. for 7 hours to convert the complex to an amide. The product was combined with 60,000 cSt DC200® fluid to prepare a 4.4 percent blend of the product.

Testing Release Compositions for Combating Toner Offset

An Imagesource 110 electrostatographic copier, from Heidelberg Digital L.L.C., Rochester, was used to test the release compositions of particular Examples and Comparative Examples, to determine their effectiveness in combating toner contamination. Contamination was measured from the toner offset to the cleaning web of the copier.

For the tests, the compositions of the Examples and Comparative Examples were used in place of the standard release oil, and the copier reproduction rate was accelerated to 150 prints per minute. Additionally, a polyester toner was employed, and the fuser setpoint temperatures were varied between a high (365° F.) temperature setpoint and a low (335° F.) temperature setpoint. Otherwise, the materials, hardware, and operating parameters of the copier were left unchanged.

In its operation, the Imagesource 110 copier employs two heater rollers to heat the fuser roller. Toner offset from paper in the copying process is removed from the fuser roller by the heater rollers, by virtue of the high surface energy of the anodized aluminum surface of the heater rollers. The indicated cleaning web is a thin Nomex® web, used to remove toner offset from the heater rollers by contact with both.

With all of the release agent compositions, test runs of 2500 prints were made using a multiple density image. Contamination of the cleaning web was determined by measuring and averaging the optical transmission density, of toner collected on the cleaning web surface. Optical transmission density was measured using an X-Rite 310 Transmission Densitometer, from X-Rite Company, Grand Rapids, Mich.

The density of the toner offset collected by the cleaning web estimates the offset rate of the fuser. As discussed, this offset acts as contamination, and accordingly offset rate indicates the degree of contamination. Therefore, the density of this offset on the web is a measure of the degree of contamination.

In making measurements here, clean webs were used to set the measured optical transmission density to zero. As to the results, in general with respect to contamination, cleaning web transmission densities below 0.3 are excellent, at 0.31 to 0.5 are good, at 0.51 to 0.79 are marginal, and at 0.8 and above are unacceptable.

However, with certain toners—e.g., polyester toners, such as those employed here—even lower contamination levels are desirable, in order to avoid irreversible buildup of contamination on the heater rollers. Specifically, it is believed that in these instances, achieving densities below 0.2 is the objective.

In any event, with respect to density values, a higher web transmission density indicates an increased fuser offset rate, and thusly a greater degree of contamination. Contamination leads to offset on electrostatographic apparatus parts and on images, and yet additionally reduces roller life.

The web transmission density values obtained from the contamination tests are set forth in Table 2.

TABLE 2

|  | High temp | Low temp | Average |
|---|---|---|---|
| Comparative Example 2 | 1.35 | 0.61 | 0.98 |
| Comparative Example 3 | 0.31 | 1.5 | 0.905 |
| Comparative Example 4 | 0.37 | 0.61 | 0.49 |
| Comparative Example 5 | 0.15 | 0.23 | 0.19 |
| Comparative Example 6 | 0.14 | 0.36 | 0.25 |
| Example 3 | 0.06 | 0.06 | 0.06 |
| Example 4 | 0.02 | 0.09 | 0.055 |
| Example 5 | 0.09 | 0.13 | 0.11 |
| Example 6 | 0.18 | 0.2 | 0.19 |
| Example 7 | 0.14 | 0.67 | 0.4 |
| Example 8 | 0.07 | 0.22 | 0.145 |

The data shown in Table 2 demonstrate that except in the case of Example 7, the results obtained with the complexes of the invention were superior to those provided by the nonfunctional, thiol functional, and acid functional silicones. The Table 2 values further demonstrate that the complexes prepared from stearic acid performed significantly better than the amine functional oil, and on average better than the complexes prepared from the higher molecular weight Unicid®700.

However, as can be seen from comparing the results of Example 4 and Comparative Example 6, once converted to the amide form, the stearic acid complex performance drops significantly. Further, the results obtained with Example 7 demonstrate that, with complexes of the invention comprising polydimethylsiloxane and hydrocarbon complexors, the polydimethylsiloxane should be large relative to the hydrocarbon.

Further as to offset, it is noted that toner not collected by the cleaning web may remain on the heater rollers. In this regard, after the tests the heater rollers were checked for contamination. The results are shown in Table 3.

TABLE 3

|  | High temp | Low temp |
|---|---|---|
| Comparative Example 2 | None | Y |
| Comparative Example 3 | None | Y |
| Comparative Example 4 | None | Y |
| Comparative Example 5 | None | None |
| Comparative Example 6 | None | Y |
| Example 3 | None | None |
| Example 4 | None | None |
| Example 5 | None | None |
| Example 6 | None | None |
| Example 7 | None | Y |
| Example 8 | None | Y |

As can be seen, the treating compositions of the invention resisted contamination where the silicone complexor was large. Further, the stearic acid complex, when converted to the amide, did not protect the heater rollers.

EXAMPLE 9

68.39 grams of the monoamino polydimethylsiloxane additive and 1.61 grams of stearic acid were combined and stirred at 105° C. for 15 minutes. A 5 gram sample was removed, and the temperature of the remainder was elevated to 150° C. After 15 additional minutes another 5 gram sample was removed, and stirring of the remainder was continued at 150° C. Thereafter, every 30 minutes yet another 5 gram sample was removed until a total of 180 minutes of heating was completed.

The samples were measured for residual amine content by potentiometric titration. in a tetrahydrofuran/methanol mixture. The results are shown in Table 4.

TABLE 4

| Temperature (° C.) | Total Time (minutes) | Percent amine remaining |
|---|---|---|
| 105 | 15 | 89 |
| 150 | 30 | 32 |
| 150 | 60 | 21 |
| 150 | 90 | 13 |
| 150 | 120 | 7 |
| 150 | 150 | 4 |
| 150 | 180 | 1 |

The values set forth in Table 4 demonstrates that the amine does not rapidly react to an amide at low temperatures, but will rapidly react at elevated temperatures. This indicates that the preparation of amine-carboxylic salt complexes of the invention must be conducted at moderate temperatures, and/or for short periods of time, to prevent substantial conversion of the amine.

EXAMPLE 10

PS513c and stearic acid were heated together, in the proportions, and under the conditions, as set forth in Table 5. In each instance, they were added to a beaker surrounded by a jacket heater, and having a Teflon stirbar for blending the beaker contents. A thermocouple was immersed in the mixture of acid and functional polydimethylsiloxane, in order to monitor temperature.

At the end of the reaction period, the beaker was plunged partially into a water bath to rapidly cool the product. One portion of the product was added to the amount of 350 cSt DC200® required to provide a composition comprising 12.5 percent by weight of the product; another portion was used to form a corresponding 12.5 percent composition with 60,000 cSt DC200. The compositions were monitored for phase separation, and the resulting observations as to blend stability are set forth in Table 5.

A sample of each 60,000 cSt composition was wiped on a 1 inch by 1 inch square of roller cut from a Digimaster fuser roller, and the excess fluid was removed with a tissue. A half-inch square of paper covered with 0.8 reflection density unfused polyester toner was placed in contact with the thusly treated sample, preheated on a flat heated bed. The resulting paper/toner/sample sandwich was pressed at 20 psi between a rigid 1 inch diameter curved backup roller and the heated bed for 5 minutes, and then removed. The temperature in the toner layer here was about 355° F. To evaluate offset resistance, the amount of toner transferred to the rubber sample was ranked on an offset value scale of between 1 and 5, with a lower number indicating less toner transfer.

With each 60,000 cSt composition, this procedure was repeated twice, thereby providing three samples. The offset values for the three samples were added, with the resulting sum for the composition being set forth in Table 5 as total offset value.

TABLE 5

| Acid:Amine Mol. Ratio | Temp (° C.) | Time (min) | Phase Separation 60K cSt | Phase Separation 350 cSt | Total Offset Value |
|---|---|---|---|---|---|
| 1.2:1 | 80–90 | 1 | No | Yes | 4 |
| 1.2:1 | 105–110 | 5 | No | Yes | 4.5 |
| 1.2:1 | 120–130 | 15 | No | No | 4 |
| 1:1 | 80–90 | 5 | No | No | 6 |
| 1:1 | 105–110 | 15 | No | No | 5 |
| 1:1 | 120–130 | 1 | No | No | 5 |
| 1:1.2 | 80–90 | 15 | No | No | 5.5 |
| 1:1.2 | 105–110 | 1 | No | No | 5.5 |
| 1:1.2 | 120–130 | 5 | No | No | 8 |

As can be seen from Table 5, under the indicated conditions, the products are easily blended in high viscosity oil, and remain stable for extended periods. For low viscosity release fluids, excess stearic acid is shown to cause some phase separation, unless the complex is heated to form some amide; once a portion of amide is formed, the material is stable to phase separation. The offset results clearly show that the complex is effective without the presence of excess amine functional fluid.

Preparation of Fluorocarbon Complexes and Release Compositions of the Invention

COMPARATIVE EXAMPLE 7

0.145 grams of perfluorododecanoic acid and 3.46 grams of 1000 cSt DC200® silicone oil were combined in a beaker, and heated to about 110–120° C., with mixing. The mixture formed a clear melt. Heat was stopped, while mixing was, continued. The blend thusly prepared rapidly crystallized within about 5 minutes, forming a paste with large crystals visible.

EXAMPLE 11

0.156 grams of perfluorododecanoic acid and 3.406 grams of the monoamino polydimethylsiloxane additive were combined in a beaker, and heated to about 110–120° C., with mixing, until melted. The mixture evolved some gas bubbles and attained a clear yellow cast. On cooling, the mixture remained clear after more than 14 hours. Different amounts of this product and 60,000 cSt DC200® silicone fluid were added together, as shown in Table 6.

EXAMPLE 12

0.431 grams of perfluorotetradecanoic acid and 4.581 grams of PS513d were combined in a beaker, and heated to about 120–130° C., with mixing, until melted. The mixture evolved some gas bubbles and became a viscous liquid with a clear yellow cast. On cooling, the mixture remained translucent after more than 1 week. It is expected that, along with the complex, a small amount of the amide also was formed.

EXAMPLE 13

0.254 grams of pentadecafluorootatanoic acid and 4.625 grams of PS513d were combined in a beaker, and heated to about 100° C., with mixing. The mixture evolved some gas bubbles and became a clear liquid with a yellow cast. On cooling, the mixture became opaque after about 2 days.

EXAMPLE 14

0.295 grams of perfluorododecanoic acid and 3.64 grams of PS513d were combined in a beaker, and heated to about 110–120° C., with mixing, until melted. The mixture evolved some gas bubbles and attained a clear yellow cast. On cooling, the mixture remained translucent after more than 48 hours.

EXAMPLE 15

0.2 grams of perfluorododecanoic acid and 2.0 grams of PS513c were combined in a beaker, and heated to about 110–120° C., with mixing, until melted. The mixture evolved some gas bubbles and attained a clear yellow cast. On cooling, the mixture remained clear after more than 1 week.

EXAMPLE 16

0.278 grams of perfluorotetradecanoic acid and 5.146 grams of the monoamino polydimethylsiloxane additive were combined in a beaker, and heated to about 110–120° C., with mixing, until melted. The mixture evolved some gas bubbles and attained a clear yellow cast. On cooling, the mixture remained clear after more than 48 hours. Here too it is expected that, along with the complex, a small amount of the amide also was formed.

EXAMPLE 17

0.172 grams of pentadecafluoroocatanoic acid and 5.553 grams of the monoamino polydimethylsiloxane additive were combined in a beaker, and heated to about 100° C., with mixing. The mixture evolved some gas bubbles and became a clear liquid with a yellow cast. On cooling, the mixture remained clear after more than 48 hours.

EXAMPLE 18

0.263 grams of perfluorododecanoic acid and 5.716 grams of the monoamino polydimethylsiloxane additive were combined in a beaker, and heated to about 110–120° C., with mixing, until melted. The mixture evolved some gas bubbles and attained a clear yellow cast. On cooling, the mixture remained clear after more than 48 hours. Yet again it is expected that, along with the complex, a small amount of the amide also was formed.

Compositions were prepared from the amounts of the Examples 11 and 16–18 products, and 60,000 cSt DC200® silicone fluid, as set forth in Table 6. These compositions were monitored for blend stability; the resulting observations also are shown in Table 6.

TABLE 6

| Additive | 60,000 cSt DC200 ® | Observation: | | |
|---|---|---|---|---|
| | (grams) | (grams) | Initial | 1 week | 2 months |
| Example 11 | .018 | 8.9 | Clear | Clear | |
| Example 11 | .038 | 4.4 | Clear | Clear | |
| Example 11 | .125 | 3.14 | Clear | Light haze | |
| Example 11 | .229 | 2.22 | Clear | Haze | |
| Example 16 | 0.03 | 10 | Clear | | Clear |
| Example 16 | 0.5 | 4.5 | Clear | | Haze |
| Example 17 | 0.03 | 10 | Clear | | Clear |
| Example 17 | 0.5 | 4.5 | Clear | | Clear |
| Example 18 | 0.03 | 10 | Clear | | Clear |
| Example 18 | 0.5 | 4.5 | Clear | | Haze |

Wetting of a PFA Surface

A 1 inch by ½ inch rectangle of PFA sleeve material was cleaned with 200 proof ethanol and taped flat. Release fluids were prepared from the additives of Examples 13, 16, 17, and 18, and from the FMS-123 additive, by adding together the amounts of additive and 350 cSt DC200® oil as set forth in Table 7, so as to provide compositions comprising 12.5 percent by weight of the additive. Two controls, of 350 cSt DC200® oil with no additive, also were employed.

With each composition, a drop of release fluid was placed on the surface and spread thinly and evenly with a small wooden stick. The dimensions of the spread patch were noted and the sample monitored for dewetting from the PFA surface; for the respective samples, the corresponding time periods set forth in Table 7 were utilized.

Dewetting is characterized by the spread layer pulling together into one or more small droplets. Partial dewetting is characterized by a slight contraction of the spread film.

The dewetting results as observed also are set forth in Table 7.

Yet additionally, the contact angle of the samples was measured after about 3 hours, using an NRL C.A. goniometer, from Rame-Hart, Inc., Mountain Lakes, N.J. The results of these measurements also are set forth in Table 7.

TABLE 7

| Additive (amount in grams) | DC200 ® 350 cSt fluid (amount in grams) | Observation | Time | Ave CA |
|---|---|---|---|---|
| — | — | Dewet | 1 min | 31.5 |
| — | — | Dewet | 1 min | 31.75 |
| Example 17 (0.375) | 2.625 | Dewet | 20 min | 29.25 |
| Example 16 (0.378) | 2.620 | Remains spread | >1 hour | 0* |
| Example 18 (0.376) | 2.625 | Remains spread | >1 hour | 0* |
| Example 13 (0.376) | 2.626 | Partially dewet | 30–40 min | 9.0 |
| Example 16 (0.085) | 6.0 | Remains spread | >1 hour | 0* |
| Example 16 (0.018) | 8.0 | Remains spread | >1 hour | 0* |
| Example 16 (0.00047) | 8.74 | Dewet | 20 min | 27.5 |
| Polymethyl-3,3,3-trifluoropropyl siloxane | — | Dewet | 1 min | 35.5 |

*Angle too small to measure, zero or <5 degrees
** grainy residue, not measurable

EXAMPLE 19

0.53 grams of Fomblin® MF300 and 11.66 grams of the monoamino polydimethylsiloxane additive were combined in a beaker, and blended at room temperature. The mixture turned clear and attained a light straw cast. The mixture remained clear after more than 72 hours.

COMPARATIVE EXAMPLE 8

0.53 grams of Fomblin® MF300 and 11.66 grams of 1000 cSt DC200® silicone oil were combined in a beaker, and blended at room temperature. The mixture turned an opaque white. Within 24 hours the mixture began to form a second phase and remained opaque.

EXAMPLE 20

0.25 grams of dodecyl benzenesulfonic acid (0.357 grams of a 70 weight percent solution in isopropanol) and 10.9 grams of the monoamino polydimethylsiloxane additive were combined in a beaker, and blended at room temperature. The mixture turned clear, and the viscosity increased from 400 cp to 620 cp. The mixture remained clear after more than 72 hours.

EXAMPLE 21

0.5 grams of dodecyl benzenesulfonic acid (0.714 grams of a 70 weight percent solution in isopropanol) and 12.2 grams of PS513 were combined in a beaker, and blended at room temperature. The mixture turned clear with a small hazy portion, and the viscosity increased from 1800 cp to 12,600 cp. After 72 hours the mixture was substantially clear.

COMPARATIVE EXAMPLE 9

0.5 grams of dodecyl benzenesulfonic acid (0.714 grams of a 70 weight percent solution in isopropanol) and 12.2 grams of 1000 cSt DC200® silicone oil were combined in a beaker, and blended at room temperature. The mixture turned opaque and phase separation occurred within 4 hours.

EXAMPLE 22

2.0 grams of Zonyl® FS-62 was combined with 22.2 grams of the monoamino polydimethylsiloxane additive in a beaker, and blended at room temperature. The opaque mixture was heated with stirring. Water and acetic acid were boiled off at about 218° F. and 260° F. respectively, leaving a clear liquid. On cooling, the liquid remained clear with a faint haze, and was determined to have a viscosity of 1150 cp.

EXAMPLE 23

1.0 grams of heptadecafluorooctanesulfonic acid is combined with 27.13 grams of the monoamino polydimethylsiloxane additive, and blended at a temperature above the melt point of the heptadecafluorooctanesulfonic acid. A uniform blend results.

Finally, although the invention has been described with reference to particular means, materials, and embodiments, it should be noted that the invention is not limited to the particulars disclosed, and extends to all equivalents within the scope of the claims.

What is claimed is:

1. A molecular complex comprising:
   (a) at least one first molecule comprising a polyorganosiloxane complexors, further comprising:
      (i) a release agent polymeric molecule; and
      (ii) at least one first complexing moiety that comprises a first complexing functional group;
   (b) at least one second molecule comprising at least one complexor selected from the grout, consisting of perfluoroalkyl complexors and perfluoropolyether complexors, further comprising:
      (i) at least one member selected from the group consisting of release agent polymeric molecules, wetting agents, antioxidants, antistat polymeric molecules and antistat nonpolymeric molecules; and
      (ii) at least one second complexing moiety that comprises a second complexing functional group; and
   (c) at least one complexed functionality;
      each release agent polymeric molecule having a surface energy of not more than about 35 dynes/cm, being liquid and heat stable at temperatures from 90° C. to 250° C.;
      the first complexing functional group comprising one of a complexing acid functional group and a complexing base functional group, and the second complexing functional group comprising the other of the complexing acid functional group and the complexing base functional group; and
      the at least one complexed functionality comprising the complexing acid functional group and the complexing base functional group, bonded by a noncovalent bond having a bond energy of at least about 20 kJ/mol.

2. The molecular complex of claim 1, wherein:
   (a) the complexing acid functional group comprises at least one member selected from the group consisting of a carboxyl group, a sulfonic acid group, a sulfonamide group, a para-phenol group, a meta-phenol group, a monoalkyl phosphate ester group, and a dialkyl phosphate ester group having the formula

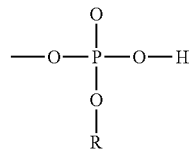

where R is selected from the group consisting of $C_1$–$C_8$ hydrocarbyl groups; and
   (b) the complexing base functional group comprises at least one member selected from the group consisting of a secondary amine group, a tertiary amine group, a primary amine group, a para-pyridine group, a meta-pyridine group, a pyrrole group, and a phosphonium group having the formula

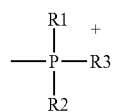

where $R^1$, $R^2$, and $R^3$ are the same or different, and are selected from the group consisting of $C_1$–$C_8$ hydrocarbyl groups.

3. The molecular complex of claim 2, wherein the complexing acid functional group comprises a sulfonic acid group, and the complexing base functional group comprises a primary amine group.

4. The molecular complex of claim 1, wherein the at least one second molecule comprises at least one member selected from the group consisting of release agent polymeric molecules, and wetting agent polymeric and antistat nonpolymeric molecules.

5. The molecular complex of claim 1, wherein the at least one first molecule has a viscosity of not more than about 250,000 cp at temperatures from 90° C. to 250° C.

6. The molecular complex of claim 1, wherein the noncovalent bond comprises a member selected from the group consisting of hydrogen and ionic bonds.

7. A molecular complex comprising:
   (a) at least one first molecule comprising at least one complexor selected from the group consisting of polyorganosiloxane complexors, hydrocarbon complexors, and perfluoropolyether complexors; and further comprising:
      (i) a release agent polymeric molecule; and
      (ii) at least one first complexing moiety that comprises a first complexing functional group
   (b) at least one second molecule comprising at least one complexor selected from the group consisting of polyorganosiloxane complexors, hydrocarbon complexors, and perfluoropolyether complexor, and further comprising:
      (i) at least one molecule selected from the group consisting of release agent polymeric molecules, wetting agents, antioxidants, antistat polymeric molecules and antistat nonpolymeric molecules; and
      (ii) at least one second complexing moiety that comprises a second complexing functional group
   (c) at least one complexed functionality;

each release agent polymeric molecule having a surface energy of not more than about 35 dynes/cm, being liquid and heat stable at temperatures from 90° C. to 250° C.

the first complexing functional group comprising one of a complexing acid functional group and a complexing base functional group, and the second complexing functional group comprising the other of the complexing acid functional group and the complexing base functional group; and the at least one complexed functionality comprising the complexing acid functional group and the complexing base functional group, bonded by a noncovalent bond having a bond energy of at least about 20 kJ/mol.

8. A molecular complex comprising:
(a) at least one first complexor, comprising:
  (i) at least one member selected from the group consisting of polyorganosiloxane complexors; and
  (i) at least one first complexing moiety that comprises a first complexing functional group;
(b) at least one second complexor, comprising
  (i) at least one member selected from the group consisting of perfluoroalkyl complexors and perfluoropolyether complexors; and
  (ii) at least one second complexing moiety that comprises a second complexing functional group; and
(c) at least one complexed functionality comprising the first complexing functional group and the second complexing functional group;
  the first complexing functional group comprising one of a complexing acid functional group and a complexing base functional group, and the second complexing functional group comprising the other of the complexing acid functional group and the complexing base functional group; and
  the at least one complexed functionality comprising the complexing acid functional group and the complexing base functional group, bonded by a noncovalent bond having a bond energy of at least about 20 kJ/mol.

9. The molecular complex of claim 8, wherein:
(a) the at least one first complexor:
  (i) has a surface energy of not more than about 35 dynes/cm;
  (ii) is liquid, and has a viscosity of not more than about 250,000 cp, at temperatures from 90° C. to 250° C.; and
  (iii) is heat stable at temperatures from 90° C. to 250° C.; and
(b) the noncovalent bond comprises a member selected from the group consisting of hydrogen and ionic bonds.

10. The molecular complex of claim 9, wherein the complexing acid functional group comprises a sulfonic acid group, and the complexing base functional group comprises a primary amine group.

11. The molecular complex of claim 8, wherein the molecular weight of the at least one polyorganosiloxane complexor comprises more than 50 percent of the molecular weight of the complex.

12. The molecular complex of claim 8, wherein the at least one first complexing moiety further comprises a $C_3$ or greater hydrocarbyl group, the $C_3$ or greater hydrocarbyl group comprising at least three carbon atoms separating the first complexing functional group from the polyorganosiloxane.

13. The molecular complex of claim 8, wherein:
(a) each first complexing functional group comprises a complexing base functional group; and
(b) each second complexing functional group comprises a complexing acid functional group.

14. The molecular complex of claim 8, wherein:
(a) the at least one first complexor comprises a first complexor comprising at least two first complexing moieties;
(b) the at least one second complexor comprises at least two second complexors; and
(c) the at least one complexed functionality comprises at least two complexed functionalities;
  (1) one complexed functionality comprising:
    (A) a first complexing functional group of the first complexor; and
    (B) a second complexing functional group of one of the at least two second complexors; and
  (2) another complexed functionality comprising:
    (A) another first complexing functional group of the first complexor, and
    (B) a second complexing functional group of another of the at least two second complexors.

15. The molecular complex of claim 14, wherein:
(a) each first complexing functional group comprises a complexing base functional group; and
(b) each second complexing functional group comprises a complexing acid functional group.

16. The molecular complex of claim 8, wherein:
(a) the at least one polyorganosiloxane complexor comprises a polydimethylsiloxane complexor comprising at least two first complexing moieties;
(b) the at least one second complexor comprises at least two perfluoroalkyl complexors; and
(c) the at least one complexed functionality comprises at least two complexing functionalities;
  (1) one complexed functionality comprising:
    (A) a first complexing functional group of the polydimethylsiloxane complexor; and
    (B) a second complexing functional group of one of the at least two perfluoroalkyl complexors; and
  (2) another complexed functionality comprising:
    (A) another first complexing functional group of the polydimethylsiloxane complexor; and
    (B) a second complexing functional group of another of the at least two perfluoroalkyl complexors.

17. The molecular complex of claim 8, wherein each perfluoroalkyl complexor comprises from about 8 carbon atoms to about 20 carbon atoms.

18. The molecular complex of claim 8, wherein for each polydimethylsiloxane complexor and each perfluoroalkyl complexor, the mole ratio of polydimethylsiloxane complexor Si atoms to perfluoroalkyl complexor carbon atoms is from about 4:1 to about 70:1.

19. The molecular complex of claim 8, wherein:
(a) the at least one first complexor comprises at least one polydimethylsiloxane complexor;
(b) the at least one second complexor comprises at least one perfluoropolyether complexor; and
(c) the at least one complexed functionality comprises a first complexing functional group of a polydimethylsiloxane complexor, and a second complexing functional group of a perfluoropolyether complexor.

20. The molecular complex of claim 19, wherein:
(a) the at least one polydimethylsiloxane complexor comprises a polydimethylsiloxane complexor comprising at least two first complexing moieties;

(b) the at least one second complexor comprises at least two perfluoropolyether complexors; and
(c) the at least one complexed functionality comprises at least two complexing functionalities;
  (1) one complexed functionality comprising:
    (A) a first complexing functional group of the polydimethylsiloxane complexor; and
    (B) a second complexing functional group of one of the at least two perfluoropolyether complexors; and
  (2) another complexed functionality comprising:
    (A) another first complexing functional group of the polydimethylsiloxane complexor; and
    (B) a second complexing functional group of another of the at least two perfluoropolyether complexors.

21. The molecular complex of claim 19, wherein each perfluoropolyether block has a molecular weight of from about 400 to about 8,000.

22. The molecular complex of claim 19, wherein for each polydimethylsiloxane block and each perfluoropolyether block, the mole ratio of polydimethylsiloxane block Si atoms to perfluoropolyether block carbon atoms is from about 2:1 to about 70:1.

23. A process for preparing a molecular complex comprising:
(a) at least one first complexor, comprising:
  (i) at least one member comprising polyorganosiloxane complexors; and
  at least one first complexing moiety that comprises a first complexing functional group comprising a primary amine group;
(b) at least one second complexor, comprising:
  (i) at least one member comprising hydrocarbon complexors the hydrocarbon complexor comprising a fluorocarbon complexor;
  (ii) at least one second complexing moiety that comprises a second complexing functional group comprising a sulfonic acid group; and
(c) at least one complexed functionality;
  the at least one first complexor having a surface energy of not more than about 35 dynes/cm, being liquid and heat stable at temperatures from 90° C. to 250° C.; and
  the at least one complexed functionality comprising the complexing acid functional group and the complexing base functional group, bonded by a noncovalent bond having a bond energy of at least about 20 kJ/mol;
the process comprising reacting reactants comprising the at least one first complexor and the at least one second complexor are
(a) added together;
(b) the at least one first complexor and the at least one second complexor are brought to a temperature sufficient to bring each complexor not in solution to a liquid state;
(c) the at least one first complexor and the at least one second complexor are blended to a form a mixture; and
(d) the mixture is maintained at a temperature below that which will effect degradation of the molecular complex;
the ratio of sulfonic acid groups to primary amine groups being sufficiently greater than 1:1 so that, at the completion of the process, there are essentially no remaining uncomplexed primary amine groups, wherein the first and second complexing functional groups complex to form the at least one complexed functionality.

24. The process of claim 23, wherein the fluorocarbon complexor comprises a partially fluorinated hydrocarbon complexor comprising a monosulfonic acid having the formula

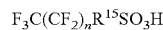

wherein
$R^{15}$ is selected from the group consisting of $C_1$–$C_{40}$ hydrocarbyl groups;
the $F_3C$, $CF_2$, and $R^{15}$ groups contain a total of at least 4 carbons; and
n is 0 to 28.

25. A molecular complex comprising:
(a) at least one first complexor comprising:
  at least one member comprising polyorganosiloxane complexors
  (ii) at least one first complexing moiety having one first complexing moiety, the first complexing functional group comprising a primary amine group; and
(b) at least one second complexor comprising:
  (i) at least one member comprising a hydrocarbon complexor, the hydrocarbon complexor comprising a fluorocarbon complexor
  (ii) at least one second complexing moiety that comprises a sulfonic acid group:
(c) at least one complexed functionality comprising the first complexing functional group and the second complexing functional group;
  the first complexing functional group comprising one of a complexing acid functional aroup and a complexing base functional group, and the second complexing functional group comprising the other of the complexing acid functional group and the complexing base functional group; and
  the at least one complexed functionality comprising the complexing acid functional group and the complexing base functional group, bonded by a noncovalent bond having a bond energy of at least about 20 kJ/mol.

26. The molecular complex of claim 25, wherein the fluorocarbon complexor comprises a partially fluorinated hydrocarbon complexor comprising a monosulfonic acid having the formula

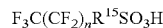

wherein
$R^{15}$ is selected from the group consisting of $C_1$–$C_{40}$ hydrocarbyl groups;
the $F_3C$, $CF_2$, and $R^{15}$ groups contain a total of at least 4 carbons; and
n is 0 to 28.

27. The molecular complex of claim 26, wherein for the polyorganosiloxane complexor and monosulfonic acid, the mole ratio of polyorganosiloxane complexor Si atoms to monosulfonic acid carbon atoms is from about 4:1 to about 70:1.

28. The molecular complex of claim 27, wherein the monosulfonic acid comprises at least one member selected from the group consisting of perfluorohexylethylsulfonic acid and perfluorooctylethylsulfonic acid.

* * * * *